(12) United States Patent
Claridge et al.

(10) Patent No.: US 11,667,788 B2
(45) Date of Patent: *Jun. 6, 2023

(54) NANOPARTICLE-COATED ELASTOMERIC PARTICULATES AND SURFACTANT-PROMOTED METHODS FOR PRODUCTION AND USE THEREOF

(71) Applicant: Xerox Corporation, Norwalk, CT (US)

(72) Inventors: Robert Claridge, Kitchener (CA); Cristina Resetco, Toronto (CA); Shivanthi Easwari Sriskandha, Mississauga (CA); Valerie M. Farrugia, Oakville (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 333 days.

This patent is subject to a terminal disclaimer.

(21) Appl. No.: 16/946,625

(22) Filed: Jun. 30, 2020

(65) Prior Publication Data

US 2021/0070988 A1    Mar. 11, 2021

Related U.S. Application Data

(60) Provisional application No. 62/897,514, filed on Sep. 9, 2019.

(51) Int. Cl.
| | | |
|---|---|---|
| *C08L 75/04* | (2006.01) | |
| *C08K 3/36* | (2006.01) | |
| *B29C 64/153* | (2017.01) | |
| *B33Y 30/00* | (2015.01) | |
| *B33Y 70/00* | (2020.01) | |
| *B29K 75/00* | (2006.01) | |
| *B82Y 30/00* | (2011.01) | |
| *B82Y 40/00* | (2011.01) | |
| *C08K 5/42* | (2006.01) | |

(52) U.S. Cl.
CPC ............ *C08L 75/04* (2013.01); *B29C 64/153* (2017.08); *C08K 3/36* (2013.01); *B29K 2075/00* (2013.01); *B33Y 30/00* (2014.12); *B33Y 70/00* (2014.12); *B82Y 30/00* (2013.01); *B82Y 40/00* (2013.01); *C08K 5/42* (2013.01); *C08K 2201/005* (2013.01)

(58) Field of Classification Search
CPC .......... C08L 75/04; B29C 64/153; C08K 3/36
USPC ....................................................... 523/402
See application file for complete search history.

(56) References Cited

U.S. PATENT DOCUMENTS

| | | | |
|---|---|---|---|
| 4,863,646 A | 9/1989 | Watanabe et al. | |
| 5,859,075 A | 1/1999 | Shukla et al. | |
| 7,740,938 B2 | 6/2010 | Helft et al. | |
| 8,822,555 B2 | 9/2014 | Kaiso et al. | |
| 10,655,025 B2 | 5/2020 | Farrugia et al. | |
| 2011/0229545 A1 | 9/2011 | Shum et al. | |
| 2013/0085197 A1 | 4/2013 | Petrovic | |
| 2015/0152214 A1 | 6/2015 | Uenlue | |
| 2017/0129177 A1 | 5/2017 | Hättig et al. | |
| 2018/0244862 A1* | 8/2018 | Price ........................ C08J 3/124 |

FOREIGN PATENT DOCUMENTS

| | | | | |
|---|---|---|---|---|
| EP | 0 866 088 A | 9/1998 | | |
| JP | 2002080629 A | 3/2002 | | |
| WO | 2015/109143 A | 7/2015 | | |
| WO | WO-2017040897 A1 * | 3/2017 | ........... | B29C 64/153 |
| WO | 2019060537 A1 | 3/2019 | | |

OTHER PUBLICATIONS

H. Patil, et al. Hot-melt extrusion: from theory to application in pharmaceutical applicaitons, AAPS PharmSciTech, vol. 17, No. 1, pp. 20-42, Feb. 2016.
U. Sundararaj, et al. Drop breakup and coalescence in polymer blends: the effects of concentration and compatibilization. Macromolecules 1995, 28, 2647-2657.
R G Kleijnen, et al.. Production and Processing of a Spherical Polybutylene Terephthalate Powder for Laser Sintering, Appl. Sci 2019, 9(7), 1308.
I. Pillin, et al. Crystallization kinetics of poly(butylene terephthalate) (PBT): Influence of additives and free carboxylic acid chain ends. Polym. Eng. Sci 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M Schmid, et al., Additive Manufacturing: Polymers Applicable for Laser Sintering (LS), Procedia Engineering 149 (2016) 457-464.
EP search report for related matter EP20193755.4 dated Jan. 28, 2021.
Stephanie Fanselow et al; "Production of micron-sized polymer particles fr additive manufacturing by melt emulsion;" AIP Conference Proceedings; vol. 1713; Mar. 9, 2016.

(Continued)

*Primary Examiner* — Deve V Hall
(74) *Attorney, Agent, or Firm* — Vorys, Sater, Seymour and Pease LLP

(57) ABSTRACT

Melt emulsification may be employed to form elastomeric particulates in a narrow size range when nanoparticles and a sulfonate surfactant are included as emulsion stabilizers. Such processes may comprise combining a polyurethane polymer, a sulfonate surfactant, and nanoparticles with a carrier fluid at a heating temperature at or above a melting point or softening temperature of the polyurethane polymer, applying sufficient shear to disperse the polyurethane polymer as liquefied droplets in the presence of the nanoparticles in the carrier fluid at the heating temperature, cooling the carrier fluid at least until elastomeric particulates in a solidified state form, and separating the elastomeric particulates from the carrier fluid. The polyurethane polymer defines a core and an outer surface of the elastomeric particulates, and the nanoparticles are associated with the outer surface. The elastomeric particulates may have a span of about 0.9 or less.

20 Claims, 13 Drawing Sheets

(56) References Cited

OTHER PUBLICATIONS

Jochen Schmidt et al.; "New approaches towards production of polymer powders for selective laser beam melting of polymers;" AIP Conference Proceedings; vol. 1914; Dec. 15, 2017.

* cited by examiner

NANOPARTICLE-COATED ELASTOMERIC PARTICULATES AND SURFACTANT-PROMOTED METHODS FOR PRODUCTION AND USE THEREOF

CROSS-REFERENCE TO RELATED APPLICATIONS

The present application claims the benefit of priority under 35 U.S.C. § 119 from U.S. Provisional Patent Application 62/897,514, filed on Sep. 9, 2019 and incorporated herein by reference in its entirety.

BACKGROUND

Three-dimensional (3-D) printing, also known as additive manufacturing, is a rapidly growing technology area. Although three-dimensional printing has traditionally been used for rapid prototyping activities, this technique is being increasingly employed for producing commercial and industrial objects, which may have entirely different structural and mechanical tolerances than do rapid prototypes.

Three-dimensional printing operates by depositing either 1) small droplets or streams of a melted or solidifiable material or 2) powder particulates in precise deposition locations for subsequent consolidation into a larger object, which may have any number of complex shapes. The larger object may be referred to as a "consolidated body" herein. Such deposition and consolidation processes typically occur under the control of a computer to afford layer-by-layer buildup of the larger object. In a particular example, consolidation of powder particulates may take place in a three-dimensional printing system using a laser to promote selective laser sintering (SLS). Incomplete interlayer fusion during selective laser sintering may result in structural weak points, which may be problematic for printing objects having exacting structural and mechanical tolerances.

Powder particulates usable in three-dimensional printing include those comprising thermoplastic polymers, including thermoplastic elastomers, metals and other solidifiable substances. Although a wide array of thermoplastic polymers are known, there are relatively few having properties compatible for use in current three-dimensional printing techniques, particularly when using Powder Bed Fusion (PBF) and other additive manufacturing techniques such as Selective Laser Sintering (SLS), Electron Beam Melting (EBM), Binder Jetting and Multi-Jet Fusion (MJF) to promote particulate consolidation. In SLS, printing methods, the powder particulates may be consolidated together using energy from a high-power laser. Typical thermoplastic polymers suitable for use in three-dimensional printing include those having sharp melting points and recrystallization points about 30-50° C. below the melting point. This temperature difference may allow more effective coalescence between adjacent polymer layers to take place, thereby promoting improved structural and mechanical integrity. Among thermoplastic polymers possessing these characteristics and having exhibited some successful use in three-dimensional printing processes include, for example, crystalline polyamides, polyurethanes, and polyether block amides.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the powder particulates existing as non-agglomerated, substantially individual particulates, which may be characteristic of ready powder flow. Lower values of the angle of repose, in contrast, may be characteristic of ready powder flow. A relatively narrow particle size distribution and regularity of the particulate shape in a sample may also aid in promoting good powder flow performance. The Hausner ratio may also be indicative of the powder flow performance of a sample.

Commercial powder particulates are oftentimes obtained by cryogenic grinding or precipitation processes, which may result in irregular particulate shapes and wide particle size distributions. Irregular particulate shapes may result in poor powder flow performance during three-dimensional printing processes. In addition, powder particulates having extensive shape irregularity, especially those obtained from current commercial processes, may afford poor packing efficiency following deposition during three-dimensional printing, thereby resulting in void formation in a printed object due to the powder particulates not packing closely together during deposition and consolidation. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate agglomeration. Moreover, fillers and flow aids may do little to improve poor packing efficiency of irregular-shaped powder particulates.

Melt emulsification, also referred to synonymously herein as melt emulsification blending, is another technique for forming powder particulates of a thermoplastic polymer, as described in U.S. Pat. No. 4,863,646, which is incorporated herein by reference in its entirety. In melt emulsification processes, a thermoplastic polymer is dispersed in a carrier fluid in which the polymer has no or minimal solubility above the polymer's melting point or softening temperature. Once the melting point or softening temperature has been exceeded in the presence of sufficient shear, liquefied polymer droplets may form as an immiscible phase in the carrier fluid. Upon cooling the liquefied polymer droplets below the melting point or softening temperature, thermoplastic polymer powder particulates having a substantially spherical shape may be formed. Unfortunately, thermoplastic polymer powder particulates formed by conventional melt emulsification processes tend to have wide particle size distributions, thereby making the powder particulates non-ideally suited for three-dimensional printing processes. Moreover, the range of thermoplastic polymers processed to date into powder particulates by melt emulsification techniques is relatively limited, and only a few of those processed are among the thermoplastic polymers suitable for use in three-dimensional printing.

Powder particulates of thermoplastic polymers may also be obtained through dispersion polymerization techniques using a steric stabilizer to promote spherical particulate formation, as described in U.S. Pat. No. 5,859,075, which is incorporated herein by reference. Powder particulates obtained in this method may have similar issues to those noted above for melt emulsification.

Three-dimensional printing using elastomeric particulates, such as polyurethane particulates, has received relatively little study. U.S. Patent Application Publication 2017/0129177, incorporated herein by reference, describes three-dimensional printing processes using polyurethane particulates prepared from bulk polyurethane, which has been cryogenically milled with silica. U.S. Patent Application Publication 2015/0152214, incorporated herein by reference, describes three-dimensional printing processes using polyurethane particulates prepared from mechanically ground and sieved polyurethane. As discussed above, such ground powder particulates may be poorly suited for three-dimensional printing processes. International Patent Application Publication 2015/109143 describes thermoplastic polyurethanes that are particularly suited for solid freeform fabrication processes, such as selective laser sintering. The thermoplastic polyurethanes have specific melting enthalpies and crystallization temperatures, which may be varied by the particular selections and quantities of synthons used in synthesizing the thermoplastic polyurethanes.

SUMMARY

The present disclosure generally relates to thermoplastic polymer powder particulates and, more specifically, to elastomeric powder particulates comprising a thermoplastic polyurethane polymer, production thereof using melt emulsification, and use thereof.

Some aspects of the present disclosure may comprise compositions comprising elastomeric particulates. The compositions comprise: a plurality of elastomeric particulates comprising a polyurethane polymer and a plurality of nanoparticles, the polyurethane polymer defining a core and an outer surface of the elastomeric particulates and the plurality of nanoparticles being associated with the outer surface; wherein the elastomeric particulates have a D50 ranging from about 1 μm to about 130 μm with a size span of about 0.9 or less.

Some aspects of the present disclosure may comprise three-dimensional printing methods utilizing compositions comprising elastomeric particulates. The three-dimensional printing methods comprise: depositing a composition of the present disclosure in a specified shape; and once deposited, heating at least a portion of the elastomeric particulates to promote consolidation thereof and formation of a consolidated body; wherein the consolidated body is formed layer-by-layer and has a porosity of about 3.5% or less after being consolidated.

Some aspects of the present disclosure may comprise methods for forming elastomeric particulates using melt emulsification. The methods comprise: combining a polyurethane polymer, a sulfonate surfactant, and nanoparticles with a carrier fluid at a heating temperature at or above a melting point or softening temperature of the polyurethane polymer; wherein the polyurethane polymer and the carrier fluid are substantially immiscible at the heating temperature; applying sufficient shear to disperse the polyurethane polymer as liquefied droplets in the presence of the sulfonate surfactant and the nanoparticles in the carrier fluid at the heating temperature; after liquefied droplets have formed, cooling the carrier fluid to at least a temperature at which elastomeric particulates in a solidified state form, the elastomeric particulates comprising the polyurethane polymer and a plurality of the nanoparticles, the polyurethane polymer defining a core and an outer surface of the elastomeric particulates and the plurality of the nanoparticles being associated with the outer surface; wherein the elastomeric particulates have a D50 ranging from about 1 μm to about 130 μm with a size span of about 0.9 or less; and separating the elastomeric particulates from the carrier fluid.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
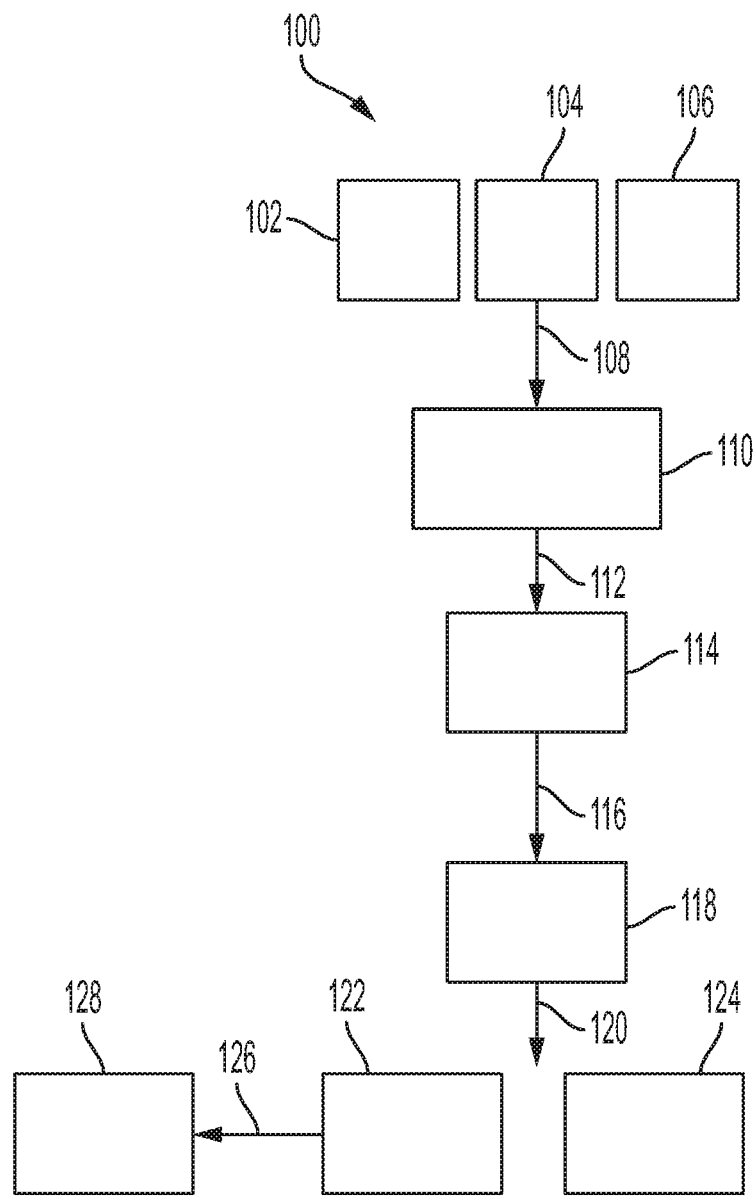
FIG. 1 is a flow chart of a non-limiting example method for producing elastomeric particulates in accordance with the present disclosure.

The present disclosure generally relates to thermoplastic polymer powder particulates and, more specifically, to elastomeric powder particulates comprising a thermoplastic polyurethane polymer, production thereof using melt emulsification, and use thereof.

As discussed above, there are a relatively limited number of thermoplastic polymer types that may be suitable for use in three-dimensional printing. Complicating the issue further, commercially available powder particulates of thermoplastic polymers tend to be fairly ill suited for use in three-dimensional printing due to their irregular particle shapes and wide particle size distributions, each of which may lead to poor powder flow and deposition characteristics. In addition, irregular particle shapes and wide particle size distributions may afford poor packing efficiency following deposition, which may lead to void formation and commensurate lack of structural and mechanical integrity in a printed object.

Advantageously, the present disclosure provides thermoplastic powder particulates, specifically elastomeric particulates comprising a polyurethane polymer, that are much more compatible for use in three-dimensional printing. Namely, the elastomeric particulates of the present disclosure may be formed by melt emulsification in a manner such that they have excellent shape regularity (substantially spherical) and a narrow particle size distribution. Moreover, the elastomeric particulates of the present disclosure may be readily sieved and exhibit low angle of repose values, which may lead to good powder flow characteristics. Although advantageous in three-dimensional printing, the elastomeric particulates disclosed herein may be advantageous in other applications as well due to their shape regularity and narrow particle size distributions.

The elastomeric particulates of the present disclosure having these properties may be produced through modified melt emulsification processes. Unlike conventional melt emulsification processes, a sufficient amount of nanoparticles, particularly oxide nanoparticles, may be incorporated with the polyurethane polymer or a similar thermoplastic polymer in the melt emulsification medium (carrier fluid), such that a uniform coating of the nanoparticles results upon the elastomeric particulates as the particulates solidify from the melt emulsification medium upon cooling. Silica nanoparticles, particularly hydrophobically functionalized silica nanoparticles, are among the oxide nanoparticles suitable for use in the disclosure herein. The nanoparticles, particularly oxide nanoparticles, may function as an emulsion stabilizer during melt emulsification to form a coating upon the elastomeric particulates to improve the powder flow properties and/or alter the particle size distribution in a desired way. Advantageously, the nanoparticle coating may lead to powder flow characteristics that are more compatible with three-dimensional printing processes. The good powder flow characteristics may lead to advantages in other applications as well, such as powder paints and coatings. Further details regarding the melt emulsification processes of the present disclosure are provided hereinbelow.

A further advantage of the present disclosure is that nanoparticles do not have to be dry blended with the elastomeric particulates in a separate blending process, thereby defining two discrete particulate processing steps: 1) particulate formation and 2) particulate modification by dry blending. Conventional melt emulsification processes, in contrast, may blend silica with the particulates post-production as a flow aid. Not only is a separate blending operation process-inefficient, but poor uniformity of coverage and non-robust adherence to the particulates may occur. Including nanoparticles in the melt emulsification medium according to the present disclosure may address these issues and provide related advantages. Since dry blending processes do not lead to incorporation of a robust nanoparticle coating upon a surface of the elastomeric particulates, different particulate characteristics may result, such as performance differences during three-dimensional printing. Thus, the nanoparticle coating in the disclosure herein may have a stabilizing effect upon the elastomeric particulates, thereby preventing or minimizing aggregation or agglomeration of the elastomeric particulates during heating, cooling, processing and drying.

Further surprisingly and advantageously, incorporation of a surfactant, particularly a sulfonate surfactant (an anionic surfactant), in the melt emulsification medium may narrow the particle size distribution even further over that obtained with the nanoparticles alone. Without being bound by theory or mechanism, multiple interactions are believed to occur between the polyurethane polymer, the nanoparticles and the sulfonate surfactant to result in narrowing of the particle size distribution. The extent of the narrowing of the particle size distribution may correlate with the quantity of sulfonate surfactant that is present. Further narrowing of the particle size distribution in the presence of a sulfonate surfactant may afford additional advantages, such as increasing the quantity of elastomeric particulates capable of passing through a sieve following production and improving flow properties. Indeed, the fraction of elastomeric particulates capable of passing through a sieve may be in excess of 90% using the disclosure herein, in contrast to a fraction of sievable material being about 80% or below without the sulfonate surfactant being present. Advantageously, any elastomeric particulates failing to pass through the sieve may be recycled in a subsequent melt emulsification process. Carrier fluids and washing solvents may similarly be recycled, if desired. Thus, the present disclosure may afford improved process economics by lessening material waste during sieving.

The elastomeric particulates disclosed herein may afford further advantages during three-dimensional printing processes. Because of their shape regularity and narrow particle size distributions, the elastomeric particulates of the present disclosure may lead to a low incidence of void formation upon consolidation to form a printed object. The low incidence of void formation may afford higher mechanical and structural integrity than is presently attainable with commercial elastomeric particulates. In addition, the elastomeric particulates of the present disclosure may be consolidated by laser sintering at lower laser power than is possible using elastomeric particulates having poorer shape regularity and a wider particle size distribution, principally by minimizing the occurrence of larger elastomeric particulates, or agglomerates thereof, which may require higher laser powers to promote sintering. A low incidence of powder formation upon the backside of a printed layer may be realized when consolidating the elastomeric particulates disclosed herein, which may contrast the behavior observed when the sulfonate surfactant is not present.

Terms used in the description and claims herein have their plain and ordinary meaning, except as modified by the paragraphs below.

As used herein, the term "immiscible" refers to a mixture of components that, when combined, form two or more phases that have less than 5 wt. % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "polyurethane" refers to a polymeric reaction product between a diisocyanate, a polyol and an optional chain extender.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "nanoparticles" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle.

As used herein, the term "D10" refers to a diameter at with 10% of the sample (on a volume basis unless otherwise specified) is comprised of particles having a diameter less than said diameter value. As used herein, the term "D50" refers to a diameter at with 50% of the sample (on a volume basis unless otherwise specified) is comprised of particles having a diameter less than said diameter value. D50 may also be referred to as the "average particle size." As used herein, the term "D90" refers to a diameter at with 90% of the sample (on a volume basis unless otherwise specified) is comprised of particles having a diameter less than said diameter value.

As used herein, the terms "diameter span," "size span" and "span" refer to the breadth of a particle size distribution and may be calculated by the relation (D90-D10)/D50 (again each D-value based on volume unless otherwise specified).

As used herein, the term "shear" refers to stirring or a similar process that induces mechanical agitation in a fluid.

As used herein, the term "aspect ratio" refers to length divided by width, wherein the length is greater than the width.

As used herein, the term "embed" relative to nanoparticles and a surface of an elastomeric particulate refers to the nanoparticle being at least partially extended into the surface such that polymer is in contact with the nanoparticle to a greater degree than would occur if the nanoparticle were simply laid on the surface of the elastomeric particulate.

As used herein, viscosity of carrier fluids are the kinematic viscosity at 25° C., unless otherwise specified, and are measured per ASTM D445-19. For commercially procured carrier fluids (e.g., PDMS oil), the kinematic viscosity data cited herein was provided by the manufacturer, whether measured according the foregoing ASTM or another standard measurement technique.

FIG. 1 is a flow chart of non-limiting example method 100 for producing elastomeric particulates in accordance with the present disclosure. As shown, polyurethane polymer 102, carrier fluid 104, and emulsion stabilizers 106 are combined 108 to produce mixture 110. Polyurethane polymer 102, carrier fluid 104, and emulsion stabilizers 106 may be combined 108 in any order and include mixing and/or heating during the process of being combined 108. In a particular example, carrier fluid 104 may be heated above a melting point or softening temperature of polyurethane polymer 102 before combining polyurethane polymer 102 and emulsion stabilizers 106 therewith. Emulsion stabilizers 106 may comprise a plurality of nanoparticles, particularly a plurality of oxide nanoparticles, and a sulfonate surfactant in any combination or ratio in the present disclosure. In emulsion stabilizers 106, one or more types of nanoparticle and one or more types of sulfonate surfactant may be present in any combination and ratio.

Heating above the melting point or softening temperature of polyurethane polymer 102 may be at any temperature below the decomposition temperature or boiling point of any of the components in the melt emulsion. In non-limiting examples, heating at a temperature about 1° C. to about 50° C., or about 1° C. to about 25° C., or about 5° C. to about 30° C., or about 20° C. to about 50° C. above the melting point or softening temperature of polyurethane polymer 102 may be conducted. In the disclosure herein, melting points may be determined by ASTM E794-06(2018) with 10° C./min ramping and cooling rates. The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min. Melting points or softening temperatures in the present disclosure may range from about 50° C. to about 400° C.

Polyurethane polymer 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

Mixture 110 is then processed 112 by applying sufficient shear to produce liquefied droplets of polyurethane polymer 102 at a temperature greater than the melting point or softening temperature of the polyurethane polymer 102, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents that decrease the quality of particulates produced therefrom may occur at higher shear rates. The sulfonate surfactant may aid in stabilizing the liquefied droplets by lessening coalescence with other liquefied droplets, thereby aiding in maintaining a narrow particle size distribution once elastomeric particulates have formed.

Examples of mixing apparatuses used for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 μm to about 1,000 μm, or about 1 μm to about 500 μm, or about 1 μm to about 150 μm, or about 1 μm to about 130 μm, or about 1 μm to about 100 μm, or about 10 μm to about 100 μm, or about 20 μm to about 80 μm, or about 20 μm to about 50 μm, or about 50 μm to about 90 μm. Particle size measurements may be made by analysis of optical images or using onboard software of a Malvern Mastersizer 3000 Aero S instrument, which uses light scattering techniques for particle size measurement.

For light scattering techniques, glass bead control samples with a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into polyurethane polymer particles (i.e., polyurethane particulates in a solidified state, also referred to herein as "elastomeric particulates"). The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate polyurethane particulates 122 from other components 124 (e.g., carrier fluid 104, excess emulsion stabilizers 106, and the like). Washing, filtering and/or the like may be conducted at this stage to purify polyurethane particulates 122 further. Polyurethane particulates 122 comprise polyurethane polymer 102 and at least a portion of emulsion stabilizers 106 coating the outer surface of polyurethane particulates 122. Nanoparticles and optionally sulfonate surfactant may be associated with the outer surface once polyurethane particulates have formed. Emulsion stabilizers 106, or a portion thereof, may be deposited as a uniform coating on polyurethane particulates 122. In some instances, which may be dependent upon non-limiting factors such as the temperature (including cooling rate), the type of polyurethane polymer 102, and the types and sizes of emulsion stabilizers 106, the nanoparticles of emulsion stabilizers 106 may become at least partially embedded within the outer surface of polyurethane particulates 122 in the course of becoming associated therewith. Even without embedment taking place, at least the nanoparticles within emulsion stabilizers 106 may remain robustly associated with polyurethane particulates 122 to facilitate their further use. In contrast, dry blending already formed polyurethane particulates (e.g., formed by cryogenic grinding or precipitation processes) with a flow aid like silica nanoparticles does not result in a robust, uniform coating of the flow aid upon the polyurethane particulates.

In the foregoing, polyurethane polymer 102 and carrier fluid 104 are chosen such that these components are immiscible or substantially immiscible (<5 wt. % solubility), particularly <1 wt. % solubility, at the various processing temperatures (e.g., from room temperature to the temperature at which liquefied droplets are formed and maintained as two or more phases).

After separating polyurethane particulates 122 from other components 124, further processing 126 of polyurethane particulates 122 may take place. In a non-limiting example further processing 126 may include, for example, sieving polyurethane particulates 122 and/or blending polyurethane particulates 122 with other substances to form processed polyurethane particulates 128. Processed polyurethane particulates 128 may be formulated for use in a desired application, such as three-dimensional printing in a non-limiting example.

Accordingly, melt emulsification processes of the present disclosure may comprise: combining an elastomeric polyurethane, a sulfonate surfactant, and nanoparticles with a carrier fluid at a heating temperature at or above a melting point or softening temperature of the polyurethane polymer; applying sufficient shear to disperse the polyurethane polymer as liquefied droplets in the presence of the sulfonate surfactant and the nanoparticles in the carrier fluid at the heating temperature; after liquefied droplets have formed, cooling the carrier fluid to at least a temperature at which elastomeric particulates in a solidified state form; and separating the elastomeric particulates from the carrier fluid. In such processes, the polyurethane polymer and the carrier fluid are substantially immiscible at the heating temperature. The elastomeric particulates comprise the polyurethane polymer and a plurality of the nanoparticles, in which the polyurethane polymer defines a core and an outer surface of the elastomeric particulates, and the plurality of the nanoparticles are associated with the outer surface. In a particular example, the elastomeric particulates may have a D50 ranging from about 1 μm to about 130 μm with size span of about 0.9 or less.

The elastomeric particulates may have a bulk density of about 0.3 g/cm$^3$ to about 0.8 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$.

Shear sufficient to form liquefied droplets may be applied through stirring the carrier fluid in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM. The stirring rate while melting the polyurethane polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Polyurethane polymers suitable for use in the disclosure herein are not considered to be particularly limited. In a particular example, suitable polyurethane polymers may have properties consistent with use in three-dimensional printing, including those having soft sections comprising a polyether, polyester, or any combination thereof. Other polyurethanes more suitable for other applications may be chosen as needed.

Although various embodiments herein are directed to elastomeric particulates comprising a polyurethane, particularly an elastomeric polyurethane, it is to be recognized that the disclosure herein may be practiced similarly with other thermoplastic elastomers. Other thermoplastic elastomers, natural or synthetic, which may be suitable for use in any of the compositions and methods disclosed herein generally fall within one of six classes: styrenic block copolymers, thermoplastic polyolefin elastomers, thermoplastic vulcanizates (also referred to as elastomeric alloys), thermoplastic copolyesters, and thermoplastic polyamides (typically block copolymers comprising a polyamide block). Examples of other suitable thermoplastic elastomers can be found in Handbook of Thermoplastic Elastomers, 2nd ed., B. M. Walker and C. P. Rader, eds., Van Nostrand Reinhold, New York, 1988. Examples of other suitable thermoplastic elastomers for use in the disclosure herein include, but are not limited to, elastomeric polyamides, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, polyacrylonitriles, silicones, and the like. Any particular disclosure herein directed to polyurethanes, including but not limited to loading ranges, processing temperature ranges, and the like, may be practiced in a similar manner with any of the foregoing or similar thermoplastic elastomers.

Suitable elastomeric styrenic block copolymers may include at least one block selected from the group of isoprene, isobutylene, butylene, ethylene/butylene, ethylene-propylene, and ethylene-ethylene/propylene. More specific examples of elastomeric styrenic block copolymers include, but are not limited to, poly(styrene-ethylene/butylene), poly(styrene-ethylene/butylene-styrene), poly(styrene-ethylene/propylene), poly(styrene-ethylene/propylene-styrene), poly(styrene-ethylene/propylene-styrene-ethylene-propylene), poly(styrene-butadiene-styrene), poly(styrene-butylene-butadiene-styrene), the like, and any combination thereof.

Examples of suitable polyamide elastomers include, but are not limited to, polyesteramide, polyetheresteramide, polycarbonate-esteramide, and polyether-block-amide elastomers.

Loading (concentration) of the polyurethane polymer in the carrier fluid may vary over a wide range. The loading in the carrier fluid may play at least some role in determining the properties of the elastomeric particulates that are obtained following solidification of the liquefied droplets. In non-limiting examples, the loading of the polyurethane polymer in the carrier fluid may range from about 1 wt. % to about 99 wt. % relative to the weight of the carrier fluid. In more particular examples, the loading of the polyurethane polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. %. The polyurethane polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the polyurethane polymer and the carrier fluid (solids loading).

Various nanoparticles, particularly oxide nanoparticles, may be suitable for use in forming elastomeric particulates of the present disclosure. Among the oxide nanoparticles that may be suitable for use in the disclosure herein include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide." The oxide nanoparticles may by hydrophilic or hydrophobic, which may be native to the nanoparticles or result from surface treatment of the particles. For example, silica nanoparticles having a hydrophobic surface treatment, like dimethylsilyl, trimethylsilyl, or the like, may be formed through reacting hydrophilic surface hydroxyl groups. Hydrophobically functionalized oxide nanoparticles may be particularly desirable in the methods and compositions of the present disclosure. Unfunctionalized oxide nanoparticles may also be suitable for use as well.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being varied. Silazane and silane hydrophobic functionalizations are facile hydrophobic functionalizations that may be used in the present disclosure. As such, the plurality of oxide nanoparticles used in the disclosure herein may comprise or consist essentially of silica nanoparticles, particularly silica nanoparticles that are hydrophobically functionalized. Silica nanoparticles may be used in combination with another type of oxide nanoparticle or non-oxide nanoparticle when the other type of oxide or non-oxide nanoparticle may convey properties to the elastomeric particulates, or an object formed therefrom, that are not attained when using silica nanoparticles alone.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

When forming elastomeric particulates according to the disclosure herein, the loading (concentration) and particle size of silica nanoparticles may vary over a wide range. The loading and particle size of the silica nanoparticles may play at least some role in determining the properties of the elastomeric particulates that are obtained following solidification of the liquefied droplets.

In non-limiting examples, loading of the silica nanoparticles in the carrier fluid may range from about 0.01 wt. % to about 10 wt. %, or about 0.05 wt. % to about 10 wt. % or about 0.05 wt. % to about 5 wt. % with respect to the weight of the polyurethane polymer. In more particular examples, loading of the silica nanoparticles may range from about 0.1 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. %. Other types of nanoparticles, particularly oxide nanoparticles, may be used at similar loading ranges.

In non-limiting examples, the particle size of the silica nanoparticles may range from about 1 nm to about 100 nm. In some instances, the particle size of the silica nanoparticles may be up to 500 nm. In more particular examples, the particle size of the silica nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. Other types of nanoparticles, particularly oxide nanoparticles, may be used at similar size ranges.

The nanoparticles, particularly silica nanoparticles and other oxide nanoparticles, may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

Particular silica nanoparticles suitable for use in the disclosure herein may be hydrophobically functionalized. Such hydrophobic functionalization may make the silica nanoparticles less compatible with water than unfunctionalized silica nanoparticles. In addition, the hydrophobic functionalization may improve dispersion of the silica nanoparticles in the carrier fluid, which may be highly hydrophobic. The hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent functionalization of a hydrophobic modification. Commercially available hydrophobically functionalized silica nanoparticles include, for example, Aerosil RX50 (Evonik, average particle size=40 nm) and Aerosil R812S (Evonik, average particle size=7 nm).

Unfunctionalized silica nanoparticles may also be used as an emulsion stabilizer in the disclosure herein.

Similarly, the loading (concentration) and type of the sulfonate surfactant may play at least some role in determining the properties of the elastomeric particulates that are obtained following solidification of the liquefied droplets. In non-limiting examples, loading of the sulfonate surfactant in the carrier fluid with respect to the polyurethane polymer may range from about 0.01 wt. % to about 10 wt. %, or about 0.1 wt. % to about 10 wt. %, or about 0.5 wt. % to about 5 wt. %, or about 1 wt. % to about 7 wt. %, or about 1 wt. % to about 5 wt. %, or about 2.5 wt. % to about 5 wt. %, or about 1 wt. % to about 3 wt. %.

Illustrative sulfonate surfactants that may be suitable for use in the disclosure herein include, for example, docusate sodium (dioctyl sodium sulfosuccinate) and similar sulfosuccinate esters, branched alkyl (e.g., $C_{12}$) diphenyl oxide disulfonate sodium salts, alkylbenzenesulfonate sodium salts (e.g., sodium dodecylbenzenesulfonate and other benzenesulfonates with linear alkyl groups), perfluorosulfonate surfactants, alpha olefin sulfonate sodium salts, lignosulfates, and any combination thereof.

Other anionic surfactants may be used similarly in the disclosure herein to form elastomeric particulates having one or more features of a D50 residing within the particle size ranges disclosed above, a size span of about 0.9 or less, and/or a fraction of the elastomeric particulates in a sample capable of passing through a sieve of specified size of about 90% or greater. Other anionic surfactants that may be usable in accordance with the disclosure herein include, for example, alkyl carboxylates, alkyl sulfates, alkyl ether sulfates, cocosulfates, glycerol sulfates, aryl sulfates, phosphates, phosphites and phosphonates and any combination thereof. For example, alkyl sulfate surfactants may afford a D50 of about 1 μm to about 130 μm and high yields of elastomeric particulates capable of passing through a sieve, but have a span greater than that obtained using a sulfonate surfactant under similar processing conditions.

Upon forming elastomeric particulates according to the disclosure herein, at least a portion of the nanoparticles, such as silica nanoparticles, may be disposed as a coating upon the outer surface of the elastomeric particulates. At least a portion of the sulfonate surfactant may be associated with the outer surface as well. The coating may be disposed substantially uniformly upon the outer surface. As used herein with respect to a coating, the term "substantially uniform" refers to even coating thickness in surface locations covered by the nanoparticles, particularly the entirety of the outer surface. Coating coverage, including nanoparticles and/or surfactant, upon the elastomeric particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs. Elastomeric particulates of the present disclosure may contain about 90 wt. % to about 99.5 wt. % of the polyurethane polymer.

Carrier fluids suitable for use in the disclosure herein include those in which the polyurethane polymer is substantially immiscible with the carrier fluid, the carrier fluid has a boiling point exceeding the melting point or softening temperature of the polyurethane polymer, and the carrier fluid has sufficient viscosity to form liquefied droplets of substantially spherical shape once the polyurethane polymer has undergone melting therein. Suitable carrier fluids may include, for example, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof.

Suitable carrier fluids may have a density of about 0.6 $g/cm^3$ to about 1.5 $g/cm^3$, and the polyurethane polymer may have a density of about 0.7 $g/cm^3$ to about 1.7 $g/cm^3$, wherein the polyurethane polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the polyurethane polymer may be heated at a temperature of about 200° C. or above. Suitable heating temperatures may be chosen based upon the melting point or softening temperature of the polyurethane polymer and the boiling point of the carrier fluid. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art. Separating the elastomeric particulates from the carrier fluid may take place by any of a variety of known separation techniques. Any of gravity settling and filtration, decantation, centrifugation, or the like may be used to separate the elastomeric particulates from the carrier fluid. The elastomeric particulates may be washed with a solvent in which the carrier fluid is soluble and the elastomeric particulates are insoluble in the course of the separation process. In addition, a solvent in which the carrier fluid is soluble and the elastomeric particulates are insoluble may be mixed with the carrier fluid and the elastomeric particulates before initially separating the elastomeric particulates from the carrier fluid.

Suitable solvents for washing the elastomer particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof.

After washing the elastomeric particulates, any of heating, vacuum drying, air drying, or any combination thereof may be performed. Additional washing and/or pyrolysis may be employed to remove the surfactant from the outer surface, if desired.

In spite of washing the elastomeric particulates with a solvent, a limited quantity of the carrier fluid may remain in some instances. In non-limiting examples, any of the elastomeric particulates of the present disclosure may comprise a non-zero amount up to about 5 wt. % carrier fluid that remains associated with the plurality of elastomeric particulates. The carrier fluid may be associated with the outer surface of the elastomeric particulates and/or trapped within voids or cavities within the elastomeric particulates. Up to 5 vol. % voids may be present in the elastomeric particulates, with the voids being filled or unfilled.

At least a majority of the elastomeric particulates obtained according to the disclosure here may be substantially spherical in shape. More typically, about 90% or greater, or about 95% or greater, or about 99% or greater of the elastomeric particulates produced by melt emulsification according to the present disclosure may be substantially spherical in shape. In other non-limiting examples, the elastomeric particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a SYSMEX FPIA 3000 particle shape and particle size analyzer, available from Malvern Instruments). The circularity of the particulate is $C_{EA}/P$, where $C_{EA}$ is the circumference of a circle having the area equivalent to the area (A) of the actual particulate.

The elastomeric particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids" Characterized by Carr Indices."

In addition, the elastomeric particulates formed according to the disclosure herein may have a plurality of silica nanoparticles or other nanoparticles that are at least partially embedded in the outer surface defined by the polyurethane polymer. When the silica nanoparticles or other nanoparticles are at least partially embedded in the outer surface, a portion of the nanoparticle structure may be located in a crater or depression in the outer surface, thereby making it more difficult to dislodge the nanoparticles from the surface. It is to be appreciated that even when substantial embedment does not occur, appropriately functionalized nanoparticles, such as hydrophobically functionalized silica nanoparticles, may non-covalently associate (e.g., in a van der Waals-type interaction) to promote retention of the nanoparticles upon the outer surface.

In a surprising result, the elastomeric particulates formed according to the disclosure herein may comprise one or more elongated structures upon the outer surface of the elastomeric particulates. The one or more elongated structures may have an aspect ratio of at least about 10. When present, silica nanoparticles or other nanoparticles may be disposed upon the surface of the one or more elongated structures. The surface coverage density of the nanoparticles upon the one or more elongated structures may be the same as or different than the surface coverage density directly upon the outer surface of the elastomeric particulates.

Elastomeric particulates isolated from the carrier fluid according to the disclosure above may be further processed to make the elastomeric particulates suitable for an intended application. In one example, the elastomeric particulates may be passed through a sieve or similar structure having an effective screening size that is greater than the average particle size of the elastomeric particulates. For example, an illustrative screening size for processing elastomeric particulates suitable for use in three-dimensional printing may have an effective screening size of about 150 µm. When referring to sieving, pore/screen sizes are described per U.S.A. Standard Sieve (ASTM E11-17). Other screening sizes, either larger or smaller, may be more suitable for elastomeric particulates destined for use in other applications. Sieving may remove larger particulates that may have formed during the melt emulsification process and/or remove agglomerated particulates that may have poor flow characteristics. In general, sieves having an effective screening size ranging from about 10 µm to about 250 µm may be used.

In addition, the elastomeric particulates passing through the sieve or a similar structure may be mixed with one or more additional components such as flow aids, fillers or other substances intended to tailor the properties of the elastomeric particulates for an intended application. Mixing of the additional components with the elastomeric particulates may be conducted by dry blending techniques. Suitable examples of flow aids (e.g., carbon black, graphite, silica, and the like) and similar substances will be familiar to one having ordinary skill in the art.

In view of the foregoing, the present disclosure further provides compositions comprising powder particulates bearing a coating comprising nanoparticles, particularly oxide nanoparticles. The compositions may comprise a plurality of elastomeric particulates comprising a polyurethane polymer and a plurality of nanoparticles, particularly oxide nanoparticles, in which the polyurethane polymer defines a core and an outer surface of the elastomeric particulates and the plurality of nanoparticles are associated with the outer surface. Optionally, a sulfonate surfactant or a similar anionic surfactant may be associate with the outer surface as well. In a particular example, the elastomeric particulates may have a D50 ranging from about 1 µm to about 130 µm with a size span of about 0.9 or less. Elastomeric particulates having such a D50 and span may be produced in the presence of a sulfonate surfactant. Elastomeric particulates having similar D50 values but a higher span may be produced in the presence of alternative types of anionic surfactants.

As discussed herein, the nanoparticles upon the outer surface of the elastomeric particulates may be metal nanoparticles or non-metal nanoparticles, particularly silica nanoparticles or other oxide nanoparticles. Silica nanoparticles bearing hydrophobic functionalization, either alone or in combination with other types of nanoparticles, may be particularly desirable as an emulsion stabilizer that becomes associated with the outer surface of the elastomeric particulates.

Based on turbidity measurements for elastomeric particulates formed in the absence of an anionic surfactant, about 80-90% of the available nanoparticles, such as silica nanoparticles, becomes associated with the elastomeric particulates. Since the loading of nanoparticles is measured relative to the polyurethane polymer, the amount of nanoparticles associated with the elastomeric particulates may be about 80-90% of the nanoparticle loading used when forming the elastomeric particulates. As such, for an nanoparticle loading of 0.25 wt. %, the corresponding amount of nanoparticles associated with the elastomeric particulates may be about 0.2 wt. % to about 0.225 wt. % and for an nanoparticle loading of 1.0 wt. %, the corresponding amount of nanoparticles associated with the elastomeric particulates may be about 0.8 wt. % to about 0.9 wt. %. Higher or lower amounts of nanoparticles associated with the elastomeric particulates may be realized for higher or lower nanoparticle loadings in the carrier fluid.

Sizes of the elastomeric particulates that may be produced according to the disclosure herein are not considered to be particularly limited, but may be about 150 µm or less in size of 125 µm or less in size, or 100 µm or less in size in order to facilitate use in various applications, such as three-dimensional printing. Particularly suitable elastomeric particulates may have a D50 ranging from about 1 µm in size to about 130 µm in size, as referenced above. Particle size measurements may be made using a Malvern Mastersizer 3000 Aero S instrument. Various factors such as the size, type and loading of nanoparticles, the size and loading of sulfonate surfactant, the shear rate, the heating temperature, the cooling rate, the carrier fluid and its viscosity, and the particular polyurethane used, as non-limiting examples, may also impact the size and/or particle size distribution of the elastomeric particulates obtained according to the present disclosure. One or more of these factors may also determine the sphericity of the elastomeric particulates and/or whether the carrier fluid is retained within the elastomeric particulates in a non-zero amount.

Depending on the conditions under which the elastomeric particulates are produced, at least a portion of the elastomeric particulates may comprise one or more elongated structures located upon the outer surface of the elastomeric particulates. The one or more elongated structures may have an aspect ratio of at least about 10.

In still additional non-limiting embodiments, the compositions disclosed herein may further comprise flow aid or additional components that may facilitate use of the elastomeric particulates in a desired application. Suitable examples of each will be familiar to one having ordinary skill in the art.

In particular applications, the compositions disclosed herein may be utilized in three-dimension printing processes, particularly those employing selective laser sintering to promote particulate consolidation. The elastomeric particulates of the present disclosure may exhibit advantageous properties over elastomeric particulates having irregular shapes or wider particulate distributions, such as those available commercially. In non-limiting examples, the elastomeric particulates of the present disclosure may undergo consolidation at lower laser powers and afford a decreased extent of void formation in an object produced by three-dimensional printing.

Three-dimensional printing processes of the present disclosure may comprise: depositing a composition of the present disclosure comprising elastomeric particulates upon a surface in a specified shape, and once deposited, heating at least a portion of the elastomeric particulates to promote consolidation thereof and formation of a consolidated body (object). The consolidated body may have a porosity of about 5% or less, or about 3% or less, or about 1% or less after being consolidated. In a particular example, heating and consolidation of the elastomeric particulates may take place by using a three-dimensional printing apparatus, such as those employing Powder Bed Fusion (PBF), Selective Laser Sintering (SLS), Selective Heat Sintering (SHS), Selective Laser Melting (SLM), Electron Beam Melting (EBM), Binder Jetting, and Multi Jet Fusion (MJF).

Any of the elastomeric particulates disclosed herein may be formulated in a composition suitable for three-dimensional printing. Choice of a particular composition and type of elastomeric particulate may be based upon various factors such as, but not limited to, the laser power used for selective laser sintering, the type of object being produced and the intended use conditions for the object.

Examples of objects formable using three-dimensional printing according to the present disclosure are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, production of artifacts that aid learning in education, 3D anatomy models to aid in surgeries, robotics, biomedical devices (orthotics), home appliances, dentistry, automotive and airplane/aerospace parts, electronics, sporting goods, and the like.

Other applications for the elastomeric particulates of the present disclosure may include, but are not limited to, use as a filler in paints and powder coatings, inkjet materials and electrophotographic toners, and the like. In some instances, the elastomeric particulates may have other preferred characteristics like diameter and span to be useful in said other applications.

Embodiments disclosed herein include:

A. Compositions comprising elastomeric particulates. The compositions comprise: a plurality of elastomeric particulates comprising a polyurethane polymer and a plurality of nanoparticles, the polyurethane polymer defining a core and an outer surface of the elastomeric particulates and the plurality of nanoparticles being associated with the outer surface; wherein the elastomeric particulates have a D50 ranging from about 1 µm to about 130 µm with a size span of about 0.9 or less.

A1. Compositions comprising elastomeric particulates. The compositions comprise: a plurality of elastomeric particulates comprising a thermoplastic elastomer and a plurality of nanoparticles, the thermoplastic elastomer defining a core and an outer surface of the elastomeric particulates and the plurality of nanoparticles being associated with the outer surface; wherein the elastomeric particulates have a D50 ranging from about 1 µm to about 130 µm with a size span of about 0.9 or less.

B. Three-dimensional printing methods utilizing compositions comprising elastomeric particulates. The three-dimensional printing methods comprise: depositing a composition of the present disclosure in a specified shape; and once deposited, heating at least a portion of the elastomeric particulates to promote consolidation thereof and formation of a consolidated body; wherein the consolidated body is formed layer-by-layer and has a porosity of about 3.5% or less after being consolidated.

C. Methods for forming elastomeric particulates using melt emulsification. The methods comprise: combining a polyurethane polymer, a sulfonate surfactant, and nanoparticles with a carrier fluid at a heating temperature at or above a melting point or softening temperature of the polyurethane polymer; wherein the polyurethane polymer and the carrier fluid are substantially immiscible at the heating temperature; applying sufficient shear to disperse the polyurethane polymer as liquefied droplets in the presence of the sulfonate surfactant and the nanoparticles in the carrier fluid at the heating temperature; after liquefied droplets have formed, cooling the carrier fluid to at least a temperature at which elastomeric particulates in a solidified state form, the elastomeric particulates comprising the polyurethane polymer and a plurality of the nanoparticles, the polyurethane polymer defining a core and an outer surface of the elastomeric particulates and the plurality of nanoparticles being associated with the outer surface; wherein the elastomeric particulates have a D50 ranging from about 1 µm to about 130 µm with a size span of about 0.9 or less; and separating the elastomeric particulates from the carrier fluid.

Each of embodiments A, A1, B, and C may have one or more of the following additional elements in any combination:

Element 1: wherein the plurality of nanoparticles comprises or consists essentially of a plurality of oxide nanoparticles.

Element 1A: wherein the plurality of oxide nanoparticles comprises or consists essentially of silica nanoparticles.

Element 1B: wherein the plurality of nanoparticles comprise or consist essentially of carbon black or polymer nanoparticles.

Element 2: wherein the plurality of oxide nanoparticles are silica nanoparticles that are hydrophobically functionalized.

Element 3: wherein the silica nanoparticles have a D50 ranging from about 5 nm to about 50 nm.

Element 4: wherein the silica nanoparticles are at least partially embedded in the outer surface.

Element 5: wherein silica nanoparticles are coated substantially uniformly on the outer surface.

Element 6: wherein the composition further comprises a sulfonate surfactant.

Element 7: wherein at least a portion of the sulfonate surfactant is associated with the outer surface.

Element 8: wherein the composition further comprises silicone oil in a non-zero amount up to about 5 wt. % of the plurality of elastomeric particulates.

Element 9: wherein at least a majority of the plurality of elastomeric particulates are substantially spherical in shape.

Element 10: wherein at least a portion of the plurality of elastomeric particulates comprise one or more elongated structures located upon the outer surface, the one or more elongated structures having an aspect ratio of at least about 10.

Element 11: wherein depositing the composition and consolidating the elastomeric particulates takes place using a three-dimensional printing apparatus.

Element 12: wherein heating takes place by selective laser sintering.

Element 13: wherein the plurality of nanoparticles remain associated with the consolidated body.

Element 14: wherein the elastomeric particulates further comprise a sulfonate surfactant.

Element 15: wherein at least a portion of the sulfonate surfactant is associated with the outer surface.

Element 16: wherein a non-zero amount up to about 5 wt. % carrier fluid remains associated with the plurality of elastomeric particulates.

Element 17: wherein the carrier fluid has a viscosity at 25° C. ranging from about 1,000 cSt to about 150,000 cSt.

Element 18: wherein the carrier fluid comprises a silicone oil.

Element 19: wherein at least a portion of the sulfonate surfactant is associated with the plurality of elastomeric particulates.

Element 20: wherein at least a portion of the sulfonate surfactant is associated with the outer surface.

Element 21: wherein a solids loading in the carrier fluid ranges from about 20% to about 50% by weight.

Element 22: wherein a loading of the nanoparticles in the carrier fluid ranges from about 0.1 wt. % to about 5 wt. % with respect to the polyurethane polymer.

Element 23: wherein the method further comprises passing at least a portion of the elastomeric particulates through a sieve; and optionally, formulating the elastomeric particulates passing through the sieve with one or more additional components.

By way of non-limiting example, exemplary combinations applicable to A, B and C include, but are not limited to, A and C include 1, 1A, 1B or 2 and 3; 1, 1A, 1B or 2 and 4; 1, 1A, 1B or 2 and 5; 1, 1A, 1B or 2 and 6; 1, 1A, 1B or 2, 6 and 7; 1, 1A, 1B or 2 and 9; 3 and 4; 3 and 5; 3 and 6; 3, 6 and 7; 3 and 9; 4 and 5; 4 and 6; 4, 6 and 7; 5 and 6; 5-7; 4 and 9; 5 and 9; 6 and 9; and 6, 7 and 9. Additional exemplary combinations applicable to B include any one of 1-9 and any one of 17-23; 17 and 18; 17 and 19; 17, 19 and 20; 17 and 21; 17 and 22; 17 and 23; 18 and 19; 18 and 20; 18 and 21; 18 and 22; 18 and 23; 19 and 20; 19 and 21; 19 and 22; 19 and 23; 21 and 22; 21 and 23; and 22 and 23. Exemplary combinations applicable to B include any one of 1-9 and 11; any one of 1-9, 11 and 12; 11 and 12; 11 and 13; 12 and 13; 11-13; 11 and 14; 11, 14 and 15; 12 and 14; and 12, 14 and 15.

Clauses of the Disclosure

Clause 1: A composition comprising:
a plurality of elastomeric particulates comprising a polyurethane polymer and a plurality of nanoparticles, the polyurethane polymer defining a core and an outer surface of the elastomeric particulates and the plurality of nanoparticles being associated with the outer surface;
wherein the elastomeric particulates have a D50 ranging from about 1 μm to about 130 μm with a size span of about 0.9 or less.

Clause 2: The composition of clause 1, wherein the plurality of nanoparticles comprises or consists essentially of a plurality of oxide nanoparticles.

Clause 2A: The composition of clause 2, wherein the plurality of oxide nanoparticles comprises or consists essentially of silica nanoparticles.

Clause 2B: The composition of clause 1, wherein the plurality of nanoparticles comprises or consists essentially of carbon black or polymer nanoparticles.

Clause 3: The composition of clause 2A, wherein the plurality of oxide nanoparticles are silica nanoparticles that are hydrophobically functionalized.

Clause 4: The composition of clause 3, wherein the silica nanoparticles have a D50 ranging from about 5 nm to about 50 nm.

Clause 5: The composition of clause 3, wherein the silica nanoparticles are at least partially embedded in the outer surface.

Clause 6: The composition of clause 2A, wherein the silica nanoparticles are coated substantially uniformly on the outer surface.

Clause 7: The composition of clause 2, further comprising a sulfonate surfactant.

Clause 8: The composition of clause 7, wherein at least a portion of the sulfonate surfactant is associated with the outer surface.

Clause 9: The composition of clause 1, further comprising:
silicone oil in a non-zero amount up to about 5 wt. % of the plurality of elastomeric particulates.

Clause 10: The composition of clause 1, wherein at least a majority of the plurality of elastomeric particulates are substantially spherical in shape.

Clause 11: The composition of clause 1, wherein at least a portion of the plurality of elastomeric particulates comprise one or more elongated structures located upon the outer surface, the one or more elongated structures having an aspect ratio of at least about 10.

Clause 12: A method comprising:
depositing the composition of clause 1 in a specified shape; and
once deposited, heating at least a portion of the elastomeric particulates to promote consolidation thereof and formation of a consolidated body;
wherein the consolidated body is formed layer-by-layer and has a porosity of about 3.5% or less after being consolidated.

Clause 13: The method of clause 12, wherein depositing the composition and consolidating the elastomeric particulates takes place using a three-dimensional printing apparatus.

Clause 14: The method of clause 13, wherein heating takes place by selective laser sintering.

Clause 15: The method of clause 12, wherein the plurality of nanoparticles remain associated with the consolidated body.

Clause 16: The method of clause 12, wherein the plurality of nanoparticles comprises or consists essentially of a plurality of oxide nanoparticles.

Clause 16A: The method of clause 16, wherein the plurality of oxide nanoparticles comprises or consists essentially of silica nanoparticles.

Clause 16B: The method of clause 16, wherein the plurality of oxide nanoparticles are silica nanoparticles that are hydrophobically functionalized.

Clause 16C: The method of clause 12, wherein the plurality of nanoparticles comprises or consists essentially of carbon black or polymer nanoparticles.

Clause 17: The method of clause 12, wherein the elastomeric particulates further comprise a sulfonate surfactant.

Clause 18: The composition of clause 17, wherein at least a portion of the sulfonate surfactant is associated with the outer surface.

Clause 19: A method comprising:
combining a polyurethane polymer, a sulfonate surfactant, and nanoparticles with a carrier fluid at a heating temperature at or above a melting point or softening temperature of the polyurethane polymer;
wherein the polyurethane polymer and the carrier fluid are substantially immiscible at the heating temperature;
applying sufficient shear to disperse the polyurethane polymer as liquefied droplets in the presence of the sulfonate surfactant and the nanoparticles in the carrier fluid at the heating temperature;
after liquefied droplets have formed, cooling the carrier fluid to at least a temperature at which elastomeric particulates in a solidified state form, the elastomeric particulates comprising the polyurethane polymer and a plurality of the nanoparticles, the polyurethane polymer defining a core and an outer surface of the elastomeric particulates and the plurality of the nanoparticles being associated with the outer surface;
wherein the elastomeric particulates have a D50 ranging from about 1 μm to about 130 μm with a size span of about 0.9 or less; and
separating the elastomeric particulates from the carrier fluid.

Clause 20: The method of clause 19, wherein the plurality of nanoparticles comprises or consists essentially of a plurality of oxide nanoparticles.

Clause 20A: The method of clause 20, wherein the plurality of the oxide nanoparticles comprises or consists essentially of silica nanoparticles.

Clause 21: The method of clause 20, wherein the plurality of the oxide nanoparticles are silica nanoparticles that are hydrophobically functionalized.

Clause 21A: The method of clause 19, wherein the plurality of nanoparticles comprises or consists essentially of carbon black or polymer nanoparticles.

Clause 22: The method of clause 21, wherein the silica nanoparticles have a D50 ranging from about 5 nm to about 50 nm.

Clause 23: The method of clause 21, wherein the silica nanoparticles are at least partially embedded in the outer surface.

Clause 24: The method of clause 21, wherein the silica nanoparticles are coated substantially uniformly on the outer surface.

Clause 25: The method of clause 19, wherein a non-zero amount up to about 5 wt. % carrier fluid remains associated with the plurality of elastomeric particulates.

Clause 26: The method of clause 19, wherein at least a majority of the plurality of elastomeric particulates are substantially spherical in shape.

Clause 27: The method of clause 19, wherein the carrier fluid has a viscosity at 25° C. ranging from about 1,000 cSt to about 150,000 cSt.

Clause 28: The method of clause 27, wherein the carrier fluid comprises a silicone oil.

Clause 29: The method of clause 19, wherein at least a portion of the sulfonate surfactant is associated with the plurality of elastomeric particulates.

Clause 30: The method of clause 29, wherein at least a portion of the sulfonate surfactant is associated with the outer surface.

Clause 31: The method of clause 19, wherein a solids loading in the carrier fluid ranges from about 20% to about 50% by weight.

Clause 32: The method of clause 19, wherein a loading of the nanoparticles in the carrier fluid ranges from about 0.1 wt. % to about 5 wt. % with respect to the polyurethane polymer.

Clause 33: The method of clause 19, wherein at least a portion of the plurality of elastomeric particulates comprise one or more elongated structures located upon the outer surface, the one or more elongated structures having an aspect ratio of at least about 10.

Clause 34: The method of clause 19, further comprising:
passing at least a portion of the elastomeric particulates through a sieve; and
optionally, formulating the elastomeric particulates passing through the sieve with one or more additional components.

To facilitate a better understanding of the embodiments of the present invention, the following examples of preferred or representative embodiments are given. In no way should the following examples be read to limit, or to define, the scope of the invention.

EXAMPLES

In the examples below, powder flow of polyurethane particulates was characterized through sieving and angle of repose measurements. The sieved yield of the polyurethane particulates was determined by exposing a quantity of polyurethane particulates to a 150 μm U.S.A. Standard Sieve (ASTM E11) and determining the fraction by mass of particulates passing through the sieve relative to the total quantity of polyurethane particulates. The sieve was used manually without particular conditions of duration of force. Angle of repose measurements were performed using a Hosokawa Micron Powder Characteristics Tester PT-R using ASTM D6393-14 "Standard Test Method for Bulk Solids" Characterized by Carr Indices."

Average particle size (D50), D10 and D90 measurements were made using a Malvern Mastersizer 3000 Aero S particle size analyzer. Optical images were obtained using a Keyence VHX-2000 digital microscope using version 2.3.5.1 software for particle size analysis (system version 1.93). An average particle size was also obtained by processing the optical image.

Comparative Example 1

To a 500 mL glass reactor, 160 g polydimethylsiloxane (PSF-30000, Clearco) was added. The reactor was set to a stirring rate of 350 rpm using an overhead stirrer, and the temperature was raised to 190° C. Further heating to 200° C. was performed, at which point, 40 g thermoplastic polyurethane pellets were added to the stirring polydimethylsiloxane. The thermoplastic polyurethane was poly [4,4'-methylenebis(phenyl isocyanate)-alt-1,4-butanediol/di(propylene glycol)/polycaprolactone] (Sigma-Aldrich). Once the thermoplastic polyurethane pellets were fully combined with the polydimethylsiloxane, the stirring rate was increased to 500 rpm and the temperature was maintained at 200° C. for 60 minutes. Thereafter, stirring was discontinued and the resulting slurry was allowed to cool to room temperature. The slurry was washed four times with heptane, and thermoplastic polyurethane particulates were obtained following vacuum filtration.

Figure 2:
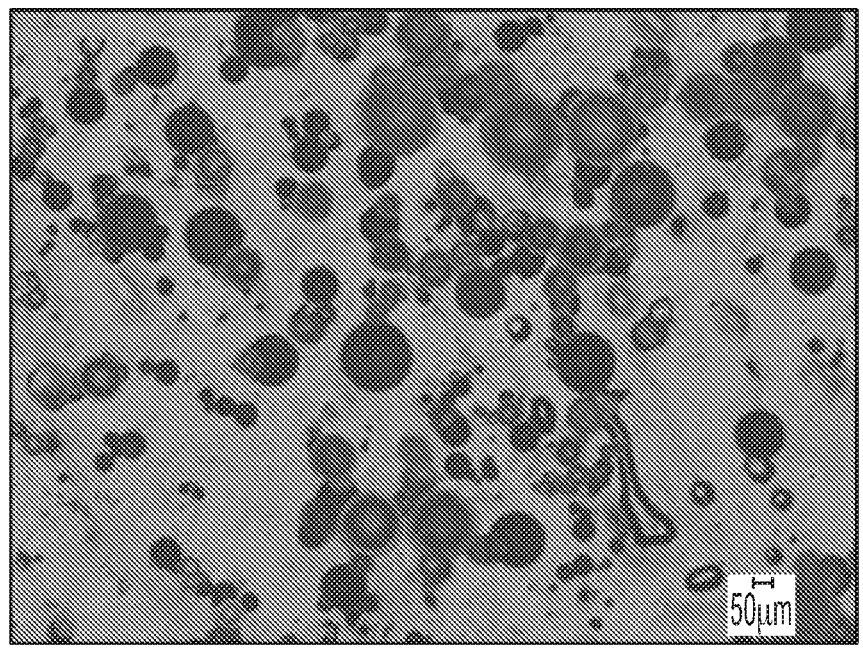
FIG. 2 shows an illustrative optical microscopy image at 150× magnification of thermoplastic polyurethane particulates obtained in Comparative Example 1.
Figure 3:
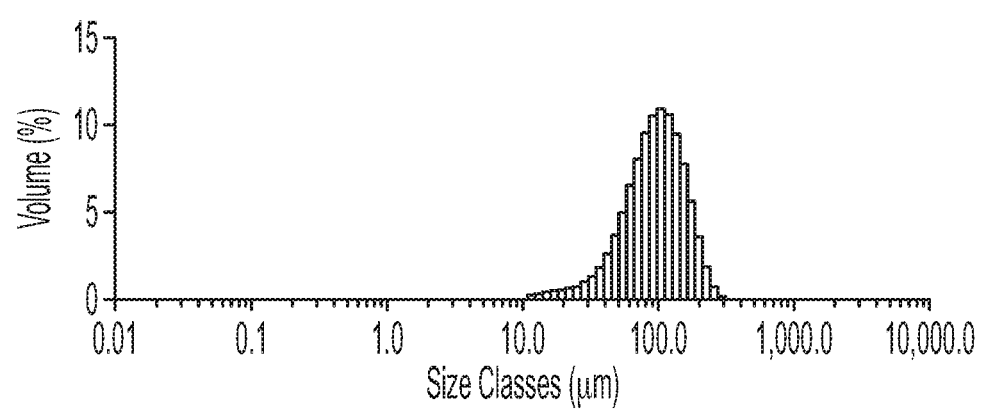
FIG. 3 shows an illustrative histogram of the particle sizes of thermoplastic polyurethane particulates obtained in Comparative Example 1.

The thermoplastic polyurethane particulates were then passed through a 150 μm sieve, and particulates passing through the sieve were characterized by optical imaging. FIG. 2 shows an illustrative optical microscopy image at 150× magnification of thermoplastic polyurethane particulates obtained in Comparative Example 1. The average particle size was 97.1 μm and a wide distribution of particle sizes was obtained (span=1.239). FIG. 3 shows an illustrative histogram of the particle sizes of thermoplastic polyurethane particulates obtained in Comparative Example 1.

Comparative Example 2

To a 500 mL glass reactor, 320 g polydimethylsiloxane (PSF-30000, Clearco) was added along with 0.25 wt. % fumed silica particulates functionalized with hexamethyldisilazane (Aerosil RX50 from Evonik, 35±10 m$^2$/g BET surface area and 40 nm average particle size). The reactor was set to a stirring rate of 200 rpm using an overhead stirrer, and the temperature was raised to 190° C. Further heating to 200° C. was performed, at which point, 80 g thermoplastic polyurethane pellets were added to the stirring polydimethylsiloxane. The thermoplastic polyurethane in this instance was ELASTOLLAN 1190A, a polyether polyurethane elastomer obtained from BASF. Once the thermoplastic polyurethane pellets were fully combined with the polydimethylsiloxane, the stirring rate was increased to 500 rpm and the temperature was maintained at 200° C. for 60 minutes. Thereafter, stirring was discontinued and the resulting slurry was allowed to cool to room temperature. The slurry was washed four times with hexanes, and thermoplastic polyurethane particulates were obtained following vacuum filtration.

Figure 4:
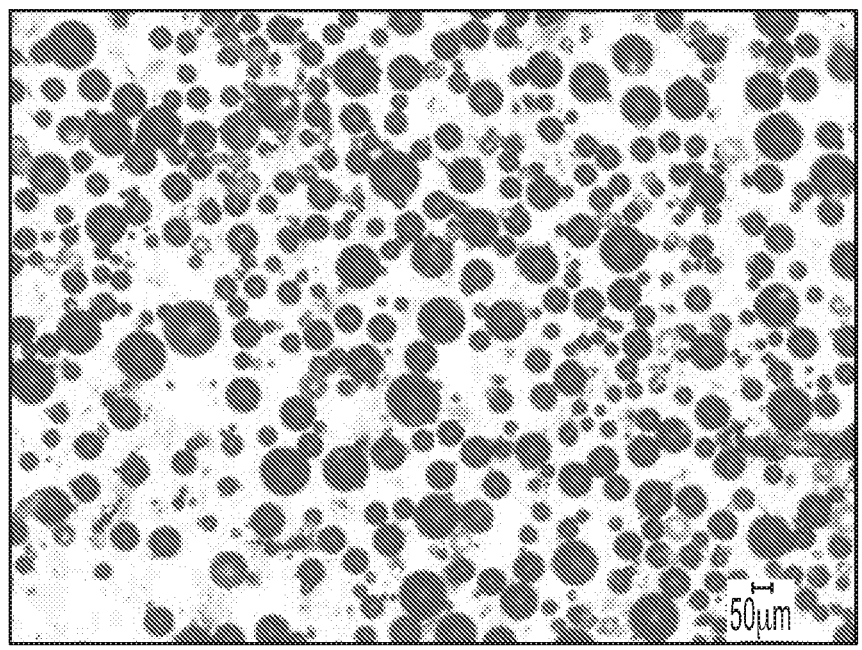
FIG. 4 shows an illustrative optical microscopy image at 150× magnification of thermoplastic polyurethane particulates obtained in Comparative Example 2.
Figure 5A:
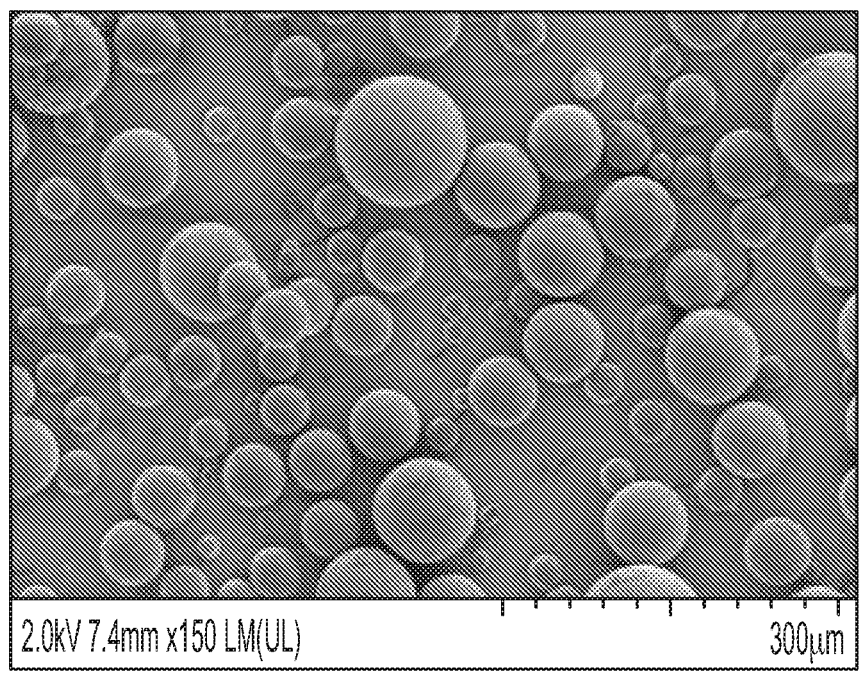
FIGS. 5A and 5B show illustrative SEM images of thermoplastic polyurethane particulates obtained in Comparative Example 2 at various magnifications.
Figure 5B:
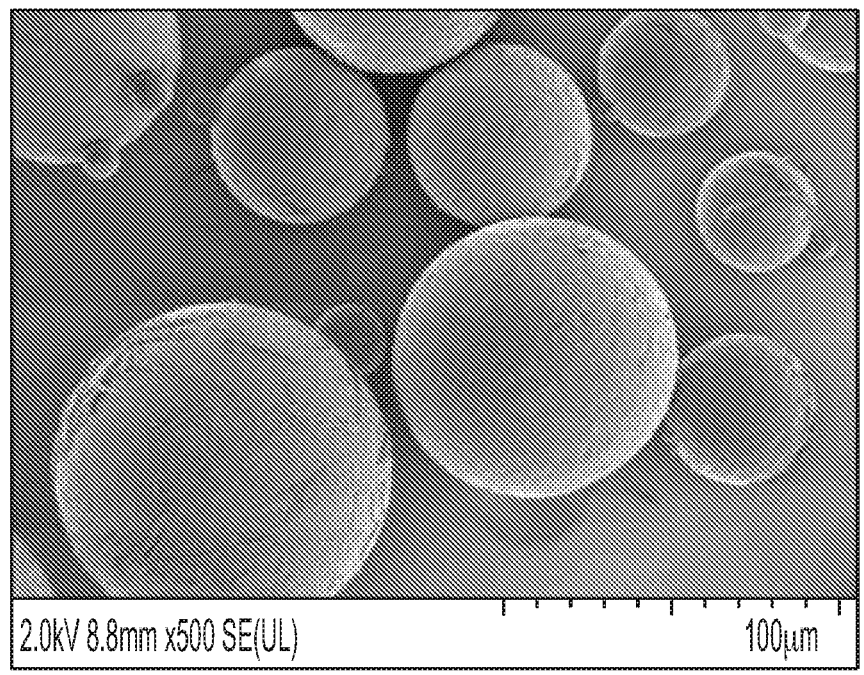
Figure 6:
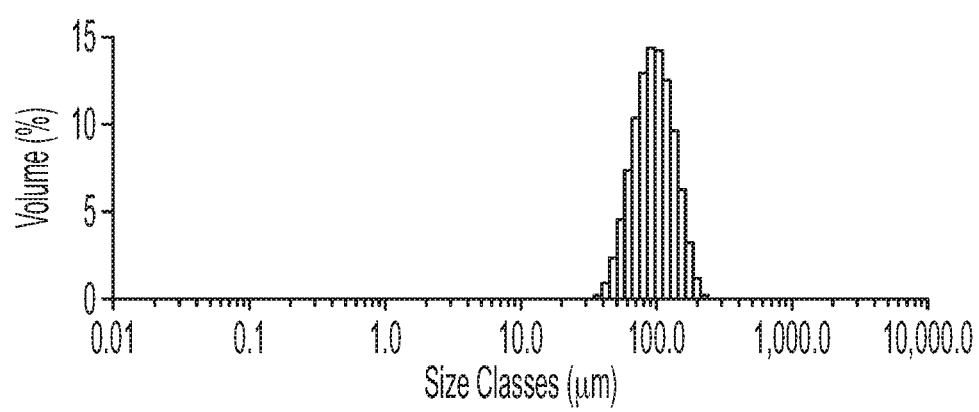
FIG. 6 shows an illustrative histogram of the particle sizes of thermoplastic polyurethane particulates obtained in Comparative Example 2.

The thermoplastic polyurethane particulates were then passed through a 150 μm sieve, and particulates passing through the sieve were characterized by optical imaging. FIG. 4 shows an illustrative optical microscopy image at 150× magnification of thermoplastic polyurethane particulates obtained in Comparative Example 2. The average particle size was 95.6 μm and a wide distribution of particle sizes was obtained (span=0.892). The angle of repose was 29.9°. FIGS. 5A and 5B show illustrative SEM images of thermoplastic polyurethane particulates obtained in Comparative Example 2 at various magnifications. FIG. 6 shows an illustrative histogram of the particle sizes of thermoplastic polyurethane particulates obtained in Comparative Example 2.

Comparative Example 3

Figure 7:
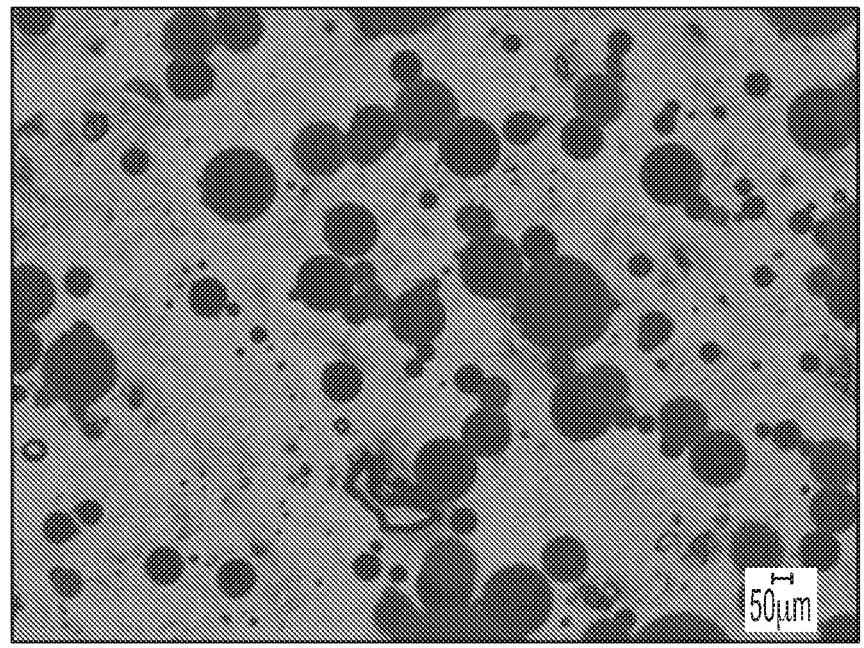
FIG. 7 shows an illustrative optical microscopy image at 100× magnification of thermoplastic polyurethane particulates obtained in Comparative Example 3.
Figure 8:
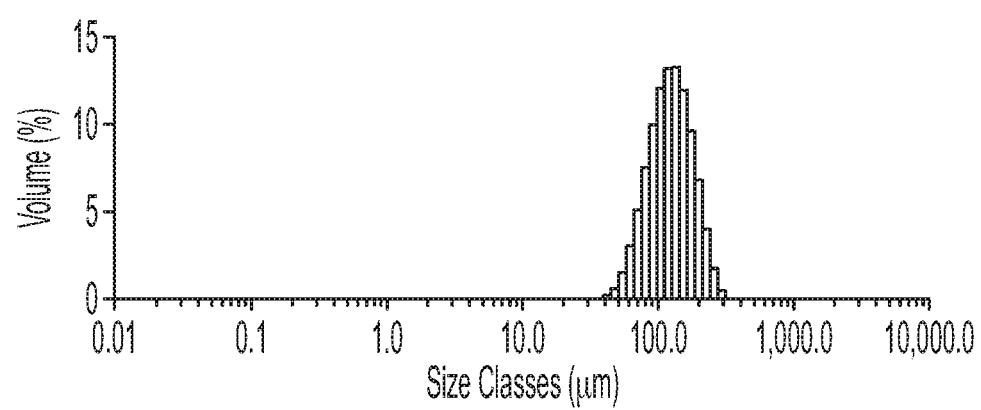
FIG. 8 shows an illustrative histogram of the particle sizes of thermoplastic polyurethane particulates obtained in Comparative Example 3.

Comparative Example 1 was repeated, except 1.0 wt. % of poly[dimethylsiloxane-co-[3-(2-(2-hydroxyethoxy) ethoxy)propylmethylsiloxane] surfactant was mixed with the PDMS before heating to the processing temperature. FIG. 7 shows an illustrative optical microscopy image at 100× magnification of thermoplastic polyurethane particulates obtained in Comparative Example 3. The average particle size was 123 μm and a wide distribution of particle sizes was obtained (span=0.977). FIG. 8 shows an illustrative histogram of the particle sizes of thermoplastic polyurethane particulates obtained in Comparative Example 3.

Comparative Example 4

Figure 9:
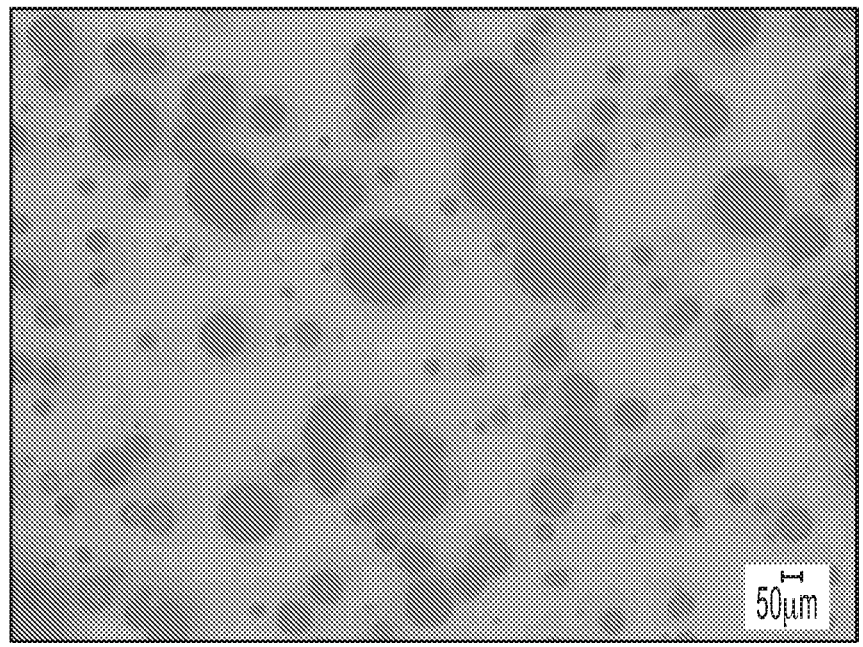
FIG. 9 shows an illustrative optical microscopy image at 100× magnification of thermoplastic polyurethane particulates obtained in Comparative Example 4.
Figure 10:
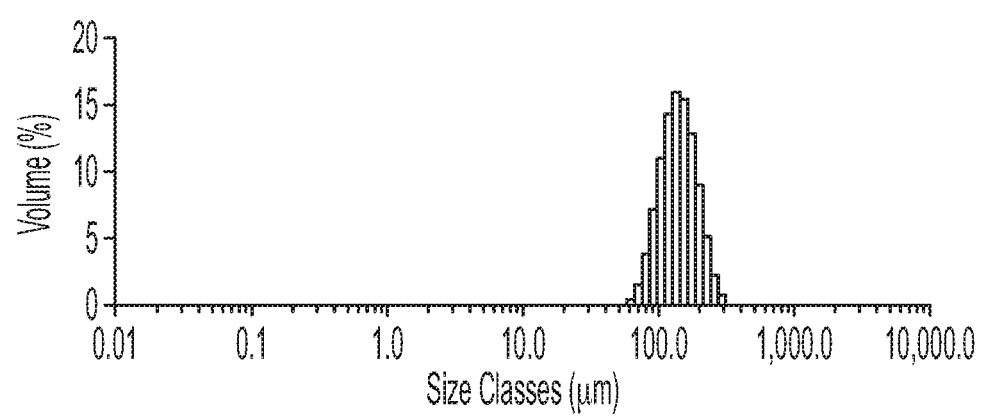
FIG. 10 shows an illustrative histogram of the particle sizes of thermoplastic polyurethane particulates obtained in Comparative Example 4.

Comparative Example 1 was repeated, except 2.5 wt. % SPAN 80 (sorbitan maleate non-ionic surfactant) was mixed with the PDMS before heating to the processing temperature. FIG. 9 shows an illustrative optical microscopy image at 100× magnification of thermoplastic polyurethane particulates obtained in Comparative Example 4. The average particle size was 139 μm and a wide distribution of particle sizes was obtained (span=0.811). FIG. 10 shows an illustrative histogram of the particle sizes of thermoplastic polyurethane particulates obtained in Comparative Example 4.

Figure 11:
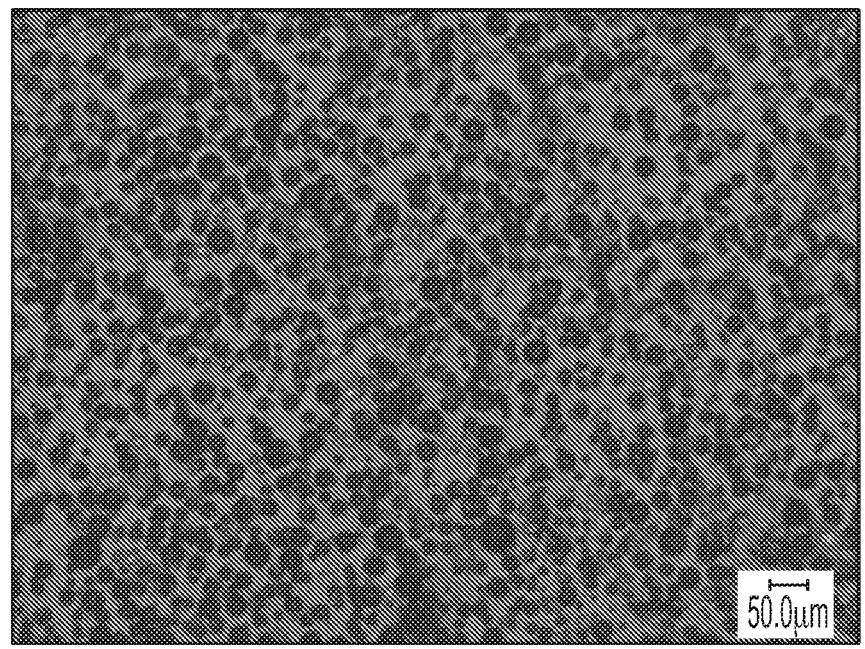
FIG. 11 shows an illustrative optical microscopy image at 300× magnification of thermoplastic polyurethane particulates obtained in Example 1.
Figure 12:
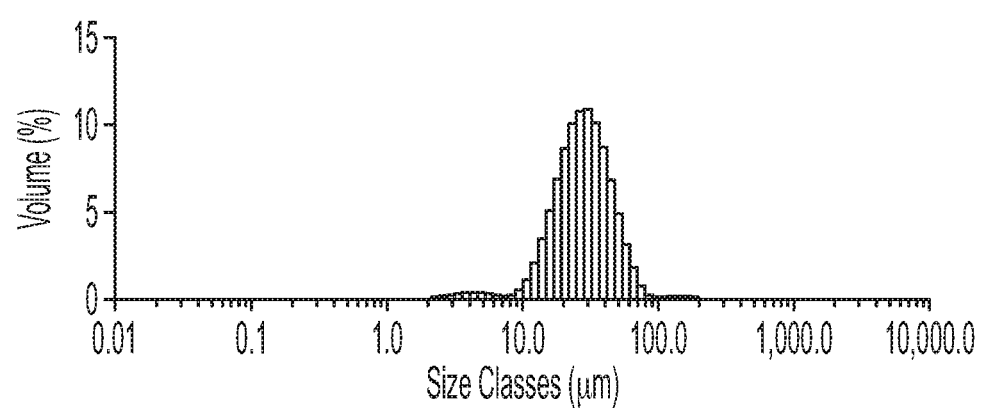
FIG. 12 shows an illustrative histogram of the particle sizes of thermoplastic polyurethane particulates obtained in Example 1.

Example 1. Comparative Example 1 was repeated, except 0.25 wt. % fumed silica particulates functionalized with hexamethyldisilazane (Aerosil RX50 from Evonik, 35±10 $m^2$/g BET surface area and 40 nm average particle size) and 1.0 wt % sodium dodecylsulfate (SDS) were mixed with the PDMS before heating to the processing temperature. FIG. 11 shows an illustrative optical microscopy image at 300× magnification of thermoplastic polyurethane particulates obtained in Example 1. The average particle size was 26.8 μm and a wide distribution of particle sizes was obtained (span=1.251). FIG. 12 shows an illustrative histogram of the particle sizes of thermoplastic polyurethane particulates obtained in Example 1.

Example 2

Comparative Example 1 was repeated, except 0.25 wt. % of fumed silica particulates functionalized with hexamethyldisilazane (Aerosil RX50 from Evonik, 35±10 $m^2$/g BET surface area and 40 nm average particle size) and 2.5 wt. % docusate sodium (sodium 1,4-bis(2-ethylhexoxy)-1,4-dioxobutane-2-sulfonate, also referred to as dioctyl sodium sulfosuccinate) were combined with the polydimethylsiloxane prior to heating the reactor to temperature and adding the thermoplastic polyurethane polymer.

Figure 13:
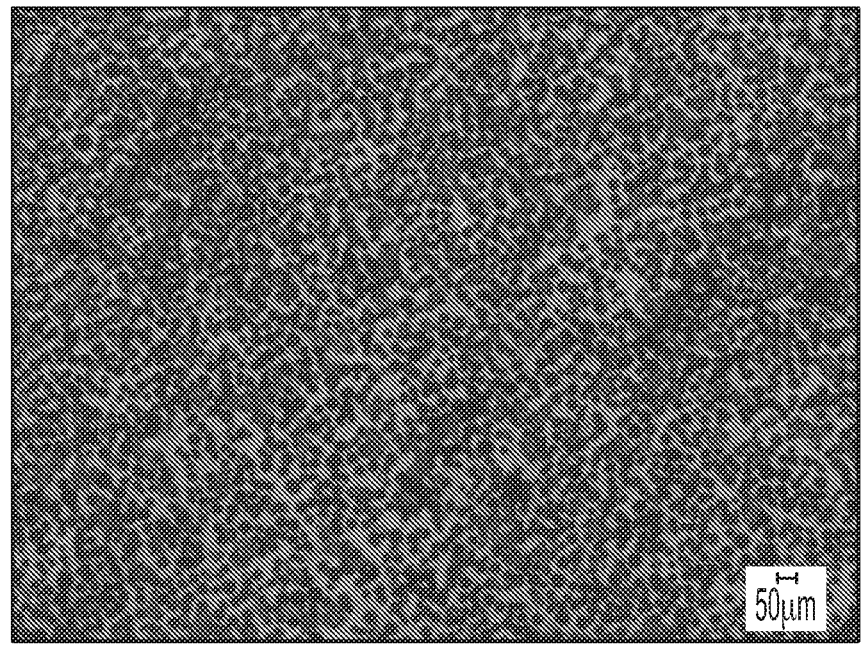
FIG. 13 shows an illustrative optical microscopy image at 150× magnification of thermoplastic polyurethane particulates obtained in Example 2.
Figure 14:
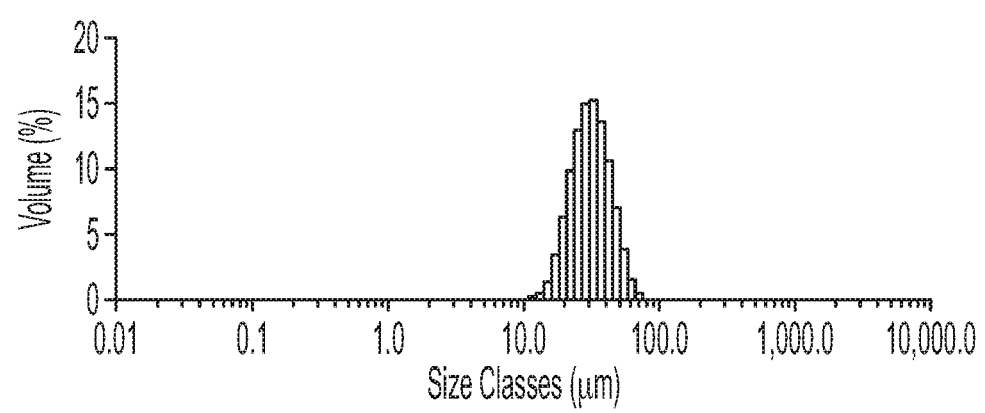
FIG. 14 shows an illustrative histogram of the particle sizes of thermoplastic polyurethane particulates obtained in Example 2.

After isolation, the thermoplastic polyurethane particulates were passed through a 150 μm sieve, and particulates passing through the sieve were characterized by optical imaging. FIG. 13 shows an illustrative optical microscopy image at 150× magnification of thermoplastic polyurethane particulates obtained in Example 2. The average particle size was 31.5 μm and a relatively narrow distribution of particle sizes was obtained (span=0.859). The angle of repose was 38.2°. FIG. 14 shows an illustrative histogram of the particle sizes of thermoplastic polyurethane particulates obtained in Example 2.

Example 3

Comparative Example 1 was repeated, except 1.0 wt. % of fumed silica particulates functionalized with hexamethyldisilazane (Aerosil RX50 from Evonik, 35±10 $m^2$/g BET surface area and 40 nm average particle size) and 1.0 wt. % docusate sodium were combined with the polydimethylsiloxane prior to heating the reactor to temperature and adding the thermoplastic polyurethane polymer.

Figure 15:
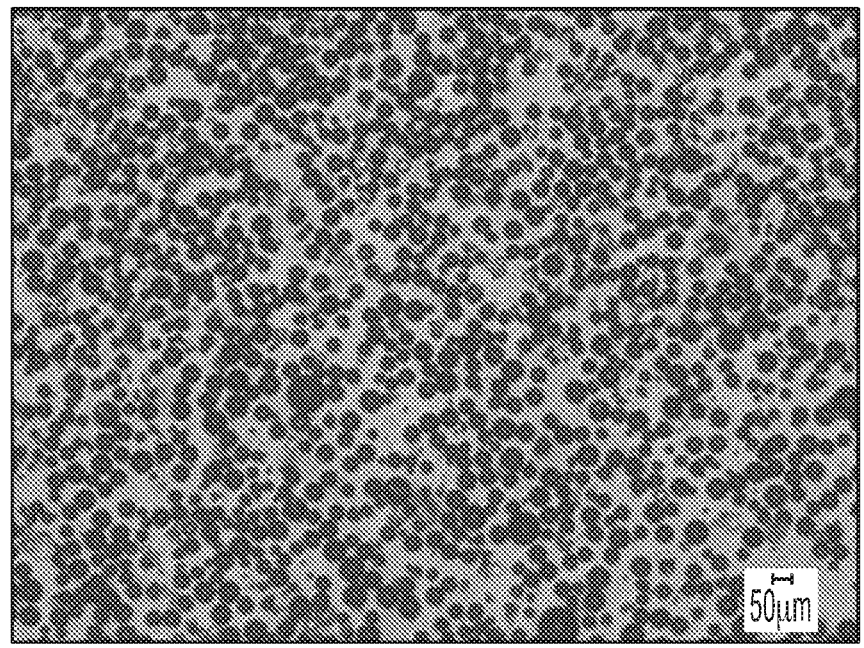
FIG. 15 shows an illustrative optical microscopy image at 150× magnification of thermoplastic polyurethane particulates obtained in Example 3.
Figure 16:
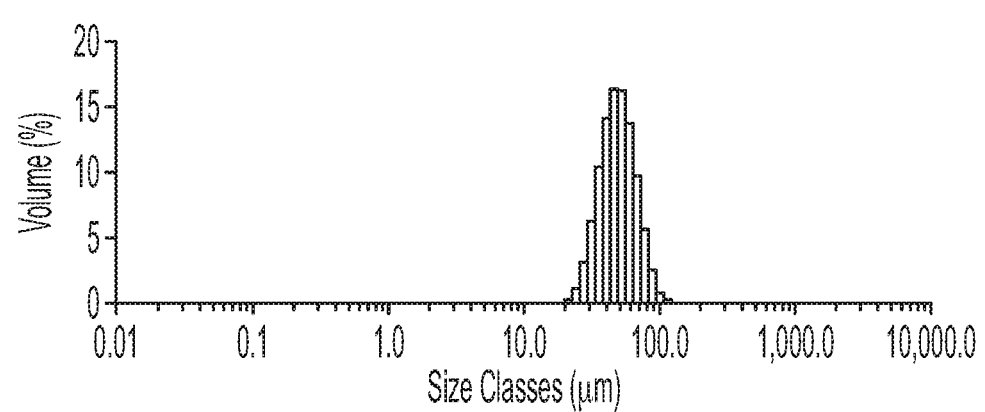
FIG. 16 shows an illustrative histogram of the particle sizes of thermoplastic polyurethane particulates obtained in Example 3.

After isolation, the thermoplastic polyurethane particulates were passed through a 150 μm sieve, and particulates passing through the sieve were characterized by optical imaging. FIG. 15 shows an illustrative optical microscopy image at 150× magnification of thermoplastic polyurethane particulates obtained in Example 3. The average particle size was 51.2 μm and a relatively narrow distribution of particle sizes was obtained (span=0.777). The angle of repose was 32.6°. FIG. 16 shows an illustrative histogram of the particle sizes of thermoplastic polyurethane particulates obtained in Example 3.

Example 4

Comparative Example 1 was repeated, except 0.25 wt. % of fumed silica particulates functionalized with hexamethyldisilazane (Aerosil RX50 from Evonik, 35±10 $m^2$/g BET surface area and 40 nm average particle size) and 5 wt. % CALFAX DB-45 (branched $C_{12}$ diphenyl oxide disulfonate, Pilot Chemical) were combined with the polydimethylsiloxane prior to heating the reactor to temperature and adding the thermoplastic polyurethane polymer.

Figure 17:
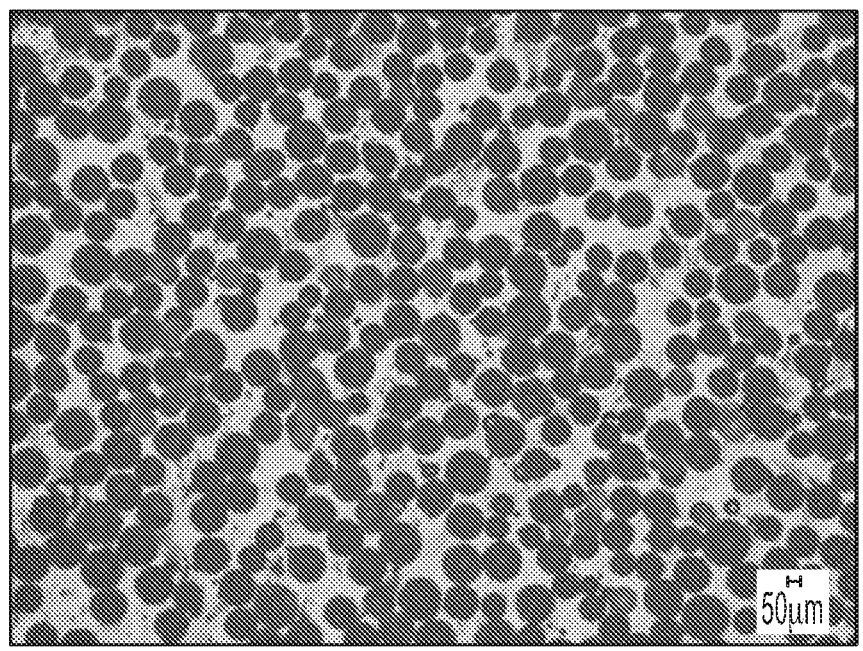
FIG. 17 shows an illustrative optical microscopy image at 150× magnification of thermoplastic polyurethane particulates obtained in Example 4.
Figure 18A:
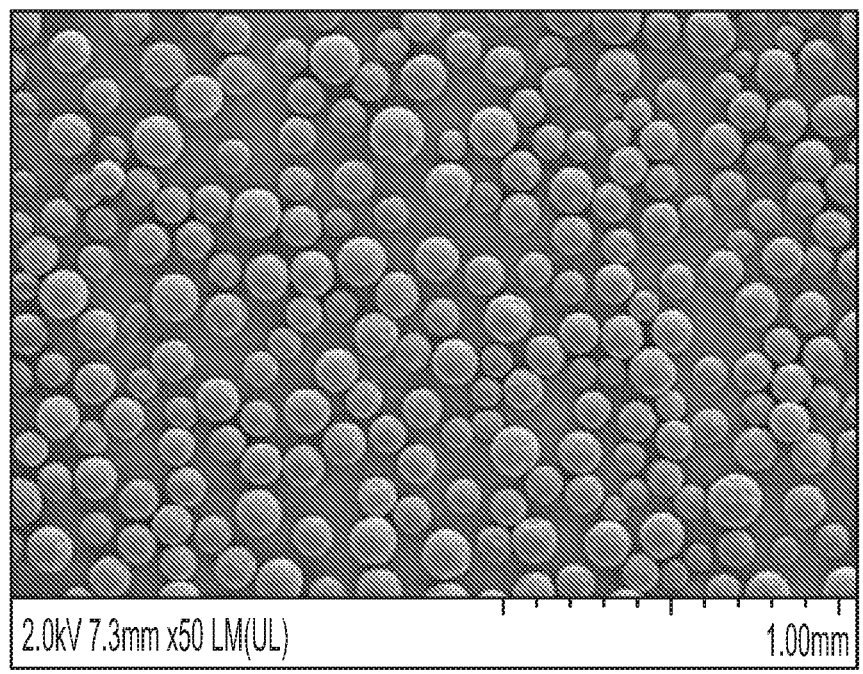
FIGS. 18A and 18B show illustrative SEM images of thermoplastic polyurethane particulates obtained in Example 4 at various magnifications.
Figure 18B:
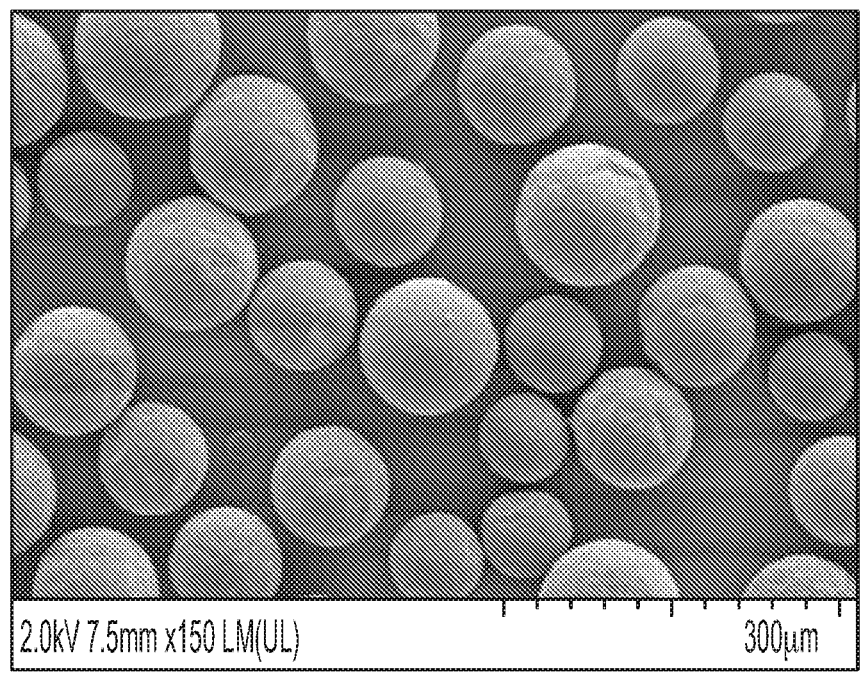
Figure 19:
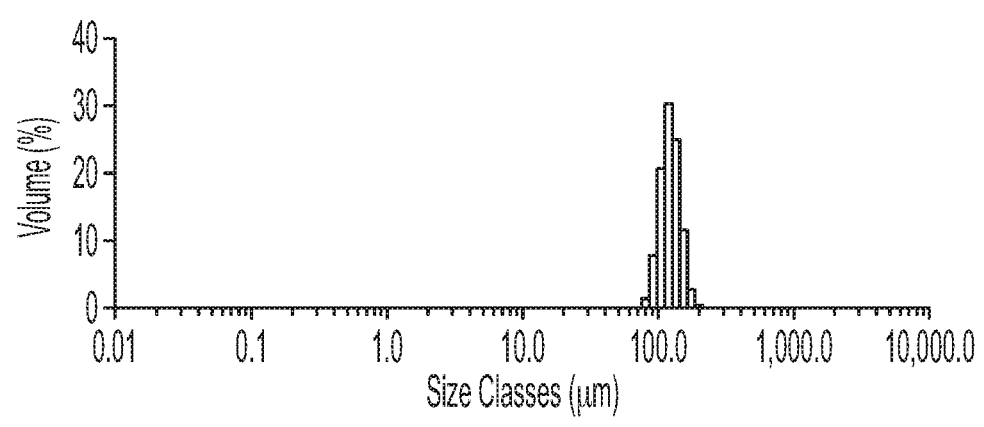
FIG. 19 shows an illustrative histogram of the particle sizes of thermoplastic polyurethane particulates obtained in Example 4.

After isolation, the thermoplastic polyurethane particulates were passed through a 150 μm sieve, and particulates passing through the sieve were characterized by optical imaging. FIG. 17 shows an illustrative optical microscopy image at 150× magnification of thermoplastic polyurethane particulates obtained in Example 4. The average particle size was 121 μm and a relatively narrow distribution of particle sizes was obtained (span=0.435). FIGS. 18A and 18B show illustrative SEM images of thermoplastic polyurethane particulates obtained in Example 4 at various magnifications. FIG. 19 shows an illustrative histogram of the particle sizes of thermoplastic polyurethane particulates obtained in Example 4.

Example 5

Comparative Example 1 was repeated, except 1.0 wt. % of fumed silica particulates functionalized with hexamethyldisilazane (Aerosil RX50 from Evonik, 35±10 $m^2$/g BET surface area and 40 nm average particle size) and 2.5 wt. % CALFAX DB-45 (branched Cu diphenyl oxide disulfonate, Pilot Chemical) were combined with the polydimethylsiloxane prior to heating the reactor to temperature and adding the thermoplastic polyurethane polymer.

Figure 20:
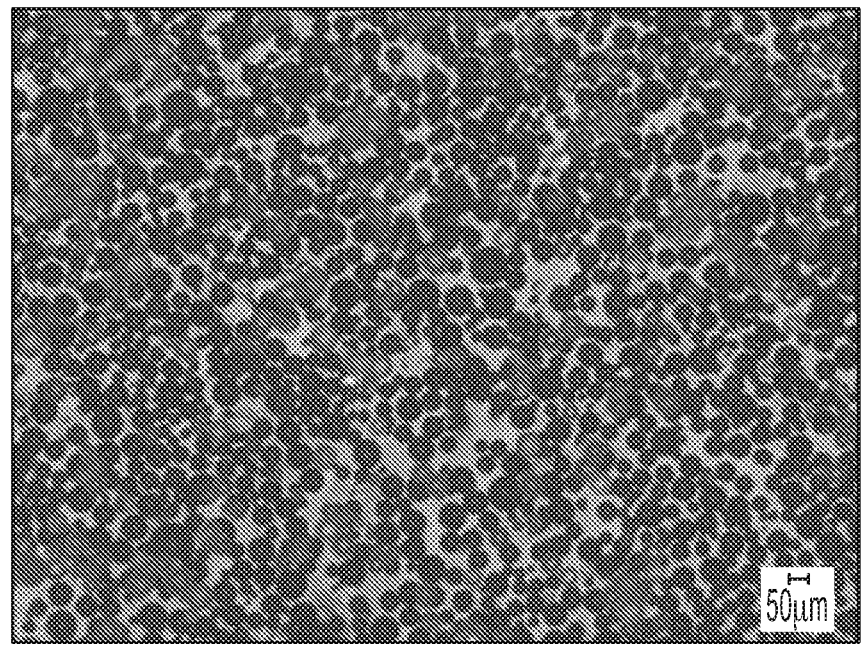
FIG. 20 shows an illustrative optical microscopy image at 150× magnification of thermoplastic polyurethane particulates obtained in Example 5.
Figure 21:
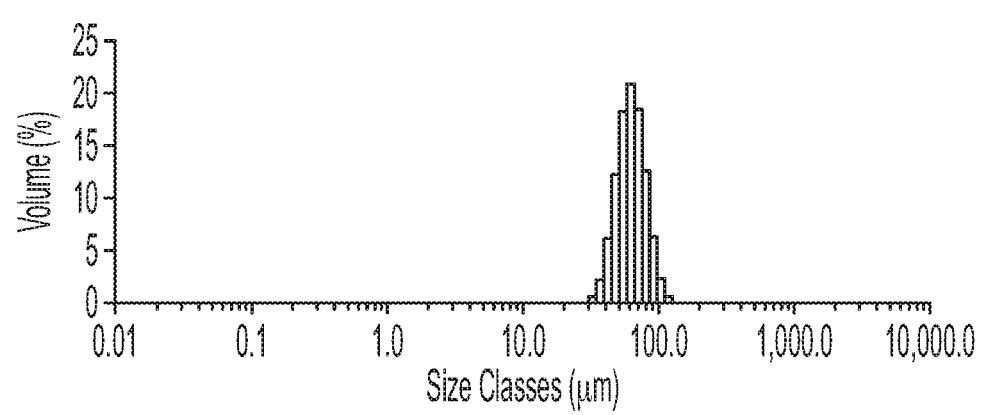
FIG. 21 shows an illustrative histogram of the particle sizes of thermoplastic polyurethane particulates obtained in Example 5.

After isolation, the thermoplastic polyurethane particulates were passed through a 150 μm sieve, and particulates passing through the sieve were characterized by optical imaging. FIG. 20 shows an illustrative optical microscopy image at 150× magnification of thermoplastic polyurethane particulates obtained in Example 5. The average particle size was 62.9 μm and a relatively narrow distribution of particle sizes was obtained (span=0.619). The angle of repose was 31.3°. FIG. 21 shows an illustrative histogram of the particle sizes of thermoplastic polyurethane particulates obtained in Example 5.

Comparison of Results

Table 1 below summarizes the formation conditions used for Comparative Examples 1-4 and the properties of the thermoplastic polyurethane particulates obtained in each instance. Table 2 below summarizes the formation conditions used for Examples 1-5 and the properties of the thermoplastic polyurethane particulates obtained in each instance.

TABLE 1

|  | Comp. Example 1 | Comp. Example 2 | Comp. Example 3 | Comp. Example 4 |
| --- | --- | --- | --- | --- |
| Solids Loading | 20% | 20% | 20% | 20% |
| Thermoplastic Polyurethane (TPU) | 40 g | 80 g | 40 g | 40 g |
| Poly(dimethylsiloxane) (PDMS) | 160 g | 320 g | 160 g | 160 g |
| PDMS Viscosity | 30,000 cSt | 30,000 cSt | 30,000 cSt | 30,000 cSt |
| Fumed Silica (wt. %) | None | 40 nm (0.25%) | None | None |
| Surfactant (wt. %) | None | None | poly[dimethylsiloxane-co-[3-(2-(2-hydroxy-ethoxy)ethoxy) propyl-methylsiloxane] (1.0%) | Span 80 (2.5%) |
| Blending Process | Melt Emuls. | Melt Emuls. | Melt Emuls. | Melt Emuls. |
| Reactor | 500 mL Kettle | 500 mL Kettle | 500 mL Kettle | 500 mL Kettle |
| Temperature | 200° C. | 200° C. | 200° C. | 200° C. |
| RPM | 500 | 500 | 500 | 500 |
| Reaction Time | 60 min | 60 min | 60 min | 60 min |
| Washing | Heptane x 4 | Heptane x 4 | Heptane x 4 | Heptane x 4 |
| Pre-Sieving Mass Recovery | 95% | 97% | 97% | 95% |
| Sieved Yield (150 μm) | 50% | 73% | 43% | 15% |
| Average Particle Size | 97.1 μm | 95.6 μm | 123 μm | 139 μm |
| Particle Size Span | 1.239 | 0.892 | 0.977 | 0.811 |
| Digital Microscope Images | FIG. 2 (150X) | FIG. 4 (100X) | FIG. 7 (100X) | FIG. 9 (100X) |
| SEM Images |  | FIGS. 5A/5B |  |  |
| Histogram | FIG. 3 | FIG. 6 | FIG. 8 | FIG. 10 |
| Angle of repose |  |  |  |  |

40

TABLE 2

|  | Example 1 | Example 2 | Example 3 | Example 4 | Example 5 |
| --- | --- | --- | --- | --- | --- |
| Solids Loading | 20% | 20% | 20% | 20% | 20% |
| Thermoplastic Polyurethane (TPU) | 40 g | 40 g | 40 g | 40 g | 40 g |
| Poly(dimethylsiloxane) (PDMS) | 160 g | 160 g | 160 g | 160 g | 160 g |
| PDMS Viscosity | 30,000 cSt | 30,000 cSt | 30,000 cSt | 30,000 cSt | 30,000 cSt |
| Fumed Silica (wt. %) | 40 nm (0.25%) | 40 nm (0.25%) | 40 nm (1.0%) | 40 nm (0.25%) | 40 nm (1.0%) |
| Surfactant (wt. %) | Sodium Dodecyl-sulfate (1.0%) | Ducosate sodium (2.5%) | Ducosate sodium (1%) | CALFAX DB-45 (5.0%) | CALFAX DB-45 (2.5%) |
| Blending Process | Melt Emuls. | Melt Emuls. | Melt Emuls. | Melt Emuls. | Melt Emuls. |
| Reactor | 500 mL Kettle | 500 mL Kettle | 500 mL Kettle | 500 mL Kettle | 500 mL Kettle |
| Temperature | 200° C. | 200° C. | 200° C. | 200° C. | 200° C. |
| RPM | 500 | 500 | 500 | 500 | 500 |
| Reaction Time | 60 min | 60 min | 60 min | 60 min | 60 min |
| Washing | Heptane x 4 | Heptane x 4 | Heptane x 4 | Heptane x 4 | Heptane x 4 |
| Pre-Sieving Mass Recovery | 92% | 87% | 92% | 93% | 91% |
| Sieved Yield (150 μm) | 97% | 95% | 95-99% | 94% | 91% |
| Average Particle Size | 26.8 μm | 31.5 μm | 51.2 μm | 121 μm | 62.9 μm |
| Particle Size Span | 1.251 | 0.859 | 0.777 | 0.435 | 0.619 |

TABLE 2-continued

|  | Example 1 | Example 2 | Example 3 | Example 4 | Example 5 |
| --- | --- | --- | --- | --- | --- |
| Digital Microscope Images | FIG. 11 (300X) | FIG. 13 (150X) | FIG. 15 (150X) | FIG. 17 (150X) | FIG. 20 (150X) |
| SEM |  |  |  | FIGS. 18A/18B |  |
| Histogram | FIG. 12 | FIG. 14 | FIG. 16 | FIG. 19 | FIG. 21 |
| Angle of repose | 49.3° | 38.2° | 32.6° |  | 31.3° |

As shown in Table 1 and 2 and the accompanying FIGS., the combination of silica nanoparticles and a sulfonate surfactant was effective to form elastomeric particulates having a narrow size distribution (span<0.9), and the post-sieving yield of the original unsieved product was greater than 90% (Examples 2-5). A sulfate surfactant (Example 1) afforded a much wider particle size distribution, in contrast, in spite having a particle size similar to that produced with sulfonate surfactants. Elastomeric particulates formed in the absence of silica nanoparticles were considerably larger in size, and the yield following sieving was low (Comparative Examples 1, 3 and 4).

Figure 22:
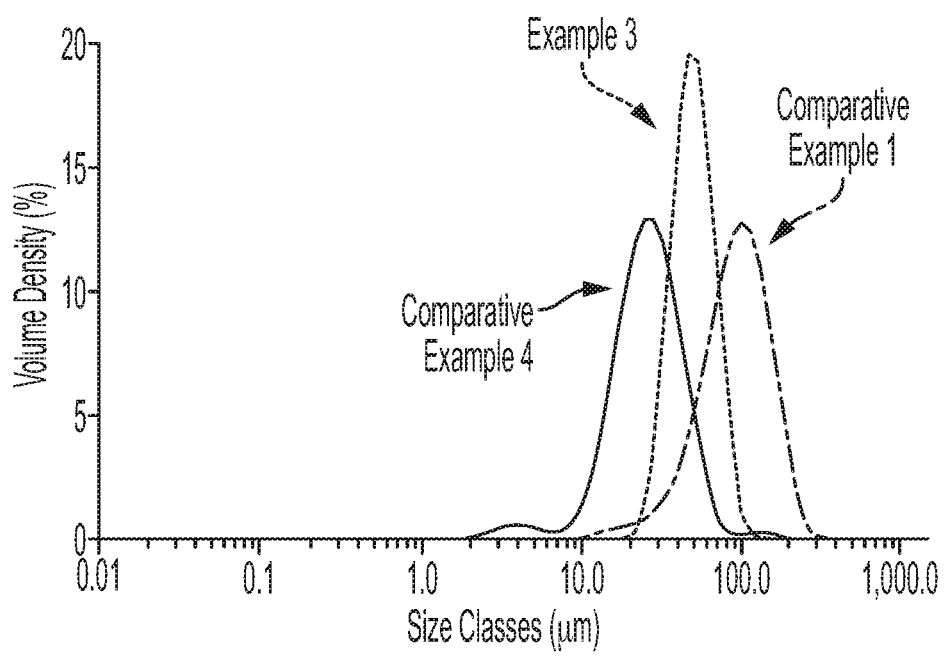
FIG. 22 shows an illustrative particle size distribution plot for thermoplastic polyurethane particulates obtained from Comparative Examples 1 and 4 and Example 3.

FIG. 22 shows an illustrative particle size distribution plot for Comparative Examples 1 and 4 and Example 3. As shown, use of silica particles and a sulfonate surfactant (Example 3) afforded a much smaller particle size distribution.

Example 5

Selective laser sintering (SLS) was performed using a Snow White SLS printer system (Sharebot). The thermoplastic polyurethane particulates of Example 3 were deposited using the SLS printer system in a 30 mm×30 mm square and then sintered under various laser power conditions specified in Table 3 below. Void percentage following sintering was calculated using the digital microscope software. Little to no caking was seen following sintering, which may be indicative of good single layer sintering performance.

TABLE 3

| Entry | Laser Power (%) | Scan Rate[1] | Temp. (° C.) | Comments | Length × Width (mm) | % Voids |
| --- | --- | --- | --- | --- | --- | --- |
| 1 | 20 | 40,000 | 108 | No sintering. |  |  |
| 2 | 25 | 40,000 | 108 | Sintered. Very flexible. | 30,055 × 29,880 | 3.12 |
| 3 | 30 | 40,000 | 108 | Sintered. Very flexible. | 30,037 × 29,722 | 1.49 |
| 4 | 35 | 40,000 | 108 | Sintered. | 30,163 × 30,301 | 1.4 |
| 5 | 40 | 40,000 | 108 | Sintered. | 30,480 × 30,288 | 1.21 |
| 6 | 45 | 40,000 | 108 | Sintered. Powder on backside. | 30,274 × 30,520 | 0.37 |

[1]Multiplying the reported scan rate by 0.04 give the scan rate in mm/s.

As shown, effective sintering was realized at a laser power above 20%, up to a power of 45% (highest value tested) to afford low-porosity materials with a small quantity of voids, under 1.5% voids at laser powers above 30%. The low void percentage is characteristic of effective fusing of the thermoplastic polyurethane particulates with one another. Powder formation in Entry 6 is believed to artificially lower the amount of voids measured.

Table 4 compares the laser sintering performance of the thermoplastic polyurethane particulates of Example 3 against those of Comparative Example 2 and commercial ADSINT polyurethane particulates.

TABLE 4

| | Laser | | % Voids | | |
| --- | --- | --- | --- | --- | --- |
| Entry | Power (%) | Scan Rate | Example 3 | Comp. Example 2 | ADSINT TPU |
| 1 | 20 | 40,000 | No sintering | No sintering | No sintering |
| 2 | 25 | 40,000 | 3.12 | No sintering | 5.07 |
| 3 | 30 | 40,000 | 1.49 | No sintering | 4.28 |
| 4 | 35 | 40,000 | 1.4 | 4.48 | 2.65 |
| 5 | 40 | 40,000 | 1.21 | 0.38 | 1.68 |
| 6 | 45 | 40,000 | 0.37 | 0.84 | No sintering |

Figure 23:
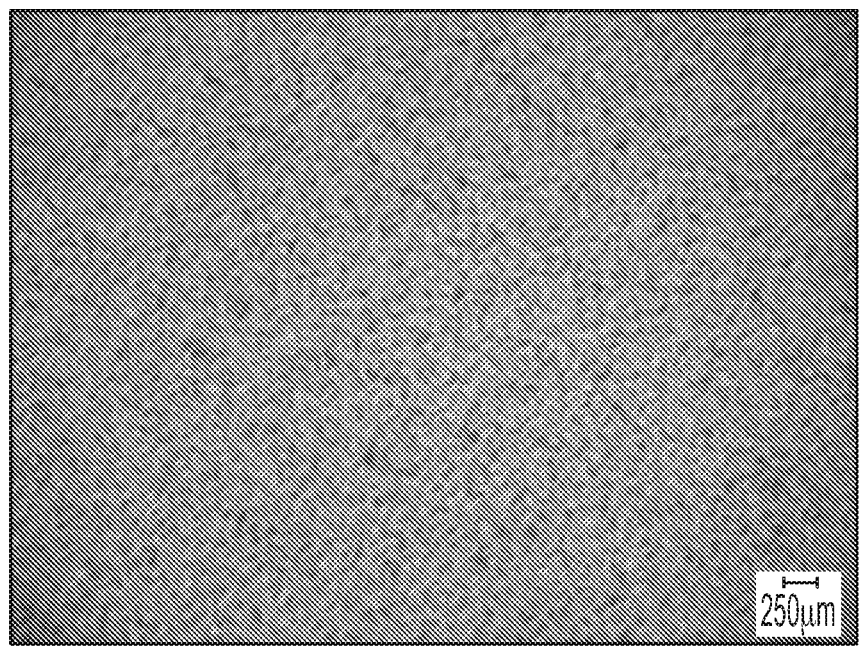
FIG. 23 shows an optical image of the printed product obtained in Example 6 using the thermoplastic polyurethane particulates specified in Entry 5 of Table 3 (40% laser power).

As shown, effective sintering was realized at a laser power above 20%, up to a power of 45% (highest value tested), to afford low-porosity materials when using the thermoplastic polyurethane particles of Example 3. The laser sintering performance of the thermoplastic polyurethane particulates of Example 3 was considerably better than that of the commercial ADSINT thermoplastic polyurethane particulates, as evaluated by the porosity obtained. The laser sintering performance of the thermoplastic polyurethane particulates of Example 3 was also superior to that of Comparative Example 2 in terms of being sinterable at lower laser powers and affording lower porosity values in most cases. As a representative example, FIG. 23 shows an optical image of the printed product obtained from Entry 5 of Table 3 (40% laser power).

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A composition comprising:
    a plurality of elastomeric particulates comprising a polyurethane polymer and a plurality of nanoparticles, the polyurethane polymer defining a core and an outer surface of the elastomeric particulates and the plurality of nanoparticles being associated with the outer surface;
    wherein the elastomeric particulates have a D50 ranging from about 1 μm to about 130 μm with a size span of about 0.9 or less.

2. The composition of claim 1, wherein the plurality of nanoparticles comprises or consists essentially of a plurality of oxide nanoparticles.

3. The composition of claim 2, wherein the plurality of oxide nanoparticles comprises or consists essentially of silica nanoparticles.

4. The composition of claim 3, wherein the silica nanoparticles have a D50 ranging from about 5 nm to about 50 nm.

5. The composition of claim 1, further comprising a sulfonate surfactant.

6. The composition of claim 5, wherein at least a portion of the sulfonate surfactant is associated with the outer surface.

7. The composition of claim 1, wherein at least a majority of the plurality of elastomeric particulates are substantially spherical in shape.

8. A method comprising:
    depositing the composition of claim 1 in a specified shape; and
    once deposited, heating at least a portion of the elastomeric particulates to promote consolidation thereof and formation of a consolidated body;
        wherein the consolidated body is formed layer-by-layer and has a porosity of about 3.5% or less after being consolidated.

9. The method of claim 8, wherein depositing the composition and consolidating the elastomeric particulates takes place using a three-dimensional printing apparatus.

10. The method of claim 8, wherein the plurality of nanoparticles remain associated with the consolidated body.

11. The method of claim 8, wherein the plurality of nanoparticles comprises or consists essentially of a plurality of oxide nanoparticles.

12. The method of claim 11, wherein the plurality of oxide nanoparticles comprises or consists essentially of silica nanoparticles.

13. The method of claim 8, wherein the elastomeric particulates further comprise a sulfonate surfactant.

14. The composition of claim 13, wherein at least a portion of the sulfonate surfactant is associated with the outer surface.

15. A method comprising:
    combining a polyurethane polymer, a sulfonate surfactant, and nanoparticles with a carrier fluid at a heating temperature at or above a melting point or softening temperature of the polyurethane polymer;
        wherein the polyurethane polymer and the carrier fluid are substantially immiscible at the heating temperature;
    applying sufficient shear to disperse the polyurethane polymer as liquefied droplets in the presence of the sulfonate surfactant and the nanoparticles in the carrier fluid at the heating temperature;
    after liquefied droplets have formed, cooling the carrier fluid to at least a temperature at which elastomeric particulates in a solidified state form, the elastomeric particulates comprising the polyurethane polymer and a plurality of the nanoparticles, the polyurethane polymer defining a core and an outer surface of the elastomeric particulates and the plurality of the nanoparticles being associated with the outer surface;

wherein the elastomeric particulates have a D50 ranging from about 1 μm to about 130 μm with a size span of about 0.9 or less; and separating the elastomeric particulates from the carrier fluid.

16. The method of claim 15, wherein the plurality of nanoparticles comprises or consists essentially of a plurality of oxide nanoparticles.

17. The method of claim 16, wherein the plurality of the oxide nanoparticles comprises or consists essentially of silica nanoparticles.

18. The method of claim 15, wherein the carrier fluid comprises a silicone oil.

19. The method of claim 15, wherein at least a portion of the sulfonate surfactant is associated with the plurality of elastomeric particulates.

20. The method of claim 19, wherein at least a portion of the sulfonate surfactant is associated with the outer surface.

* * * * *